US007499960B2

(12) United States Patent
Dageville et al.

(10) Patent No.: US 7,499,960 B2
(45) Date of Patent: Mar. 3, 2009

(54) ADAPTIVE MEMORY ALLOCATION

(75) Inventors: Benoit Dageville, Redwood Shores, CA (US); Mohamed Zait, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1019 days.

(21) Appl. No.: 09/969,334

(22) Filed: Oct. 1, 2001

(65) Prior Publication Data

US 2003/0065688 A1 Apr. 3, 2003

(51) Int. Cl.
*G06F 17/30* (2006.01)
(52) U.S. Cl. ........................ 707/205; 707/206; 707/200
(58) Field of Classification Search ................ 707/5, 707/10, 205, 200; 711/171
See application file for complete search history.

(56) References Cited

U.S. PATENT DOCUMENTS

| | | | | |
|---|---|---|---|---|
| 5,274,805 | A * | 12/1993 | Ferguson et al. ................ 707/7 |
| 5,561,786 | A | 10/1996 | Morse ..................... 395/497.1 |
| 5,594,889 | A * | 1/1997 | Colgate et al. .............. 711/171 |
| 5,765,157 | A * | 6/1998 | Lindholm et al. ........... 707/101 |
| 5,784,699 | A | 7/1998 | McMahon et al. .......... 711/171 |
| 5,787,300 | A | 7/1998 | Wijaya .......................... 712/1 |
| 5,799,210 | A | 8/1998 | Cohen et al. .................. 710/56 |
| 5,826,082 | A | 10/1998 | Bishop et al. ............... 395/674 |
| 5,832,475 | A * | 11/1998 | Agrawal et al. ................. 707/2 |
| 5,835,958 | A * | 11/1998 | Long et al. .................. 707/205 |
| 5,860,144 | A | 1/1999 | Frank et al. ................. 711/206 |
| 5,987,580 | A | 11/1999 | Jasuja et al. ................ 711/170 |
| 6,192,460 | B1 * | 2/2001 | Goleman et al. ............ 707/204 |
| 6,272,486 | B1 * | 8/2001 | Garth et al. ..................... 707/2 |
| 6,502,176 | B1 * | 12/2002 | Kobayashi et al. .......... 711/171 |
| 6,625,709 | B2 | 9/2003 | Aiken et al. ................. 711/170 |
| 6,757,802 | B2 * | 6/2004 | Trainin et al. ............... 707/205 |

(Continued)

OTHER PUBLICATIONS

PCT Search Report, Apr. 10, 2003, Europe.

(Continued)

*Primary Examiner*—Baoquoc N. To
(74) *Attorney, Agent, or Firm*—Silicon Valley Patent Group LLP; Omkar Suryadevara

(57) ABSTRACT

An operator in accordance with the invention changes, over time, the amount of memory that is allocated and used by the operator, to process data input to the operator. For example, a sort operator that is used to implement a query in a relational database may allocate a certain amount of memory initially based on an estimate of input data, and thereafter increase the allocated memory if the size of the input data was underestimated. In one embodiment, the operator checks, from time to time while processing a given set of input data, its current memory usage against an operator-level target or limit (either of which is called "memory bound"), and makes appropriate changes to conform to the memory bound. For example, if the memory bound is decreased, a currently-executing hash join operator may change its mode from an optimal mode (in which mode there is no access to disk), to a one pass mode (in which mode data is read from or written to disk only once), or alternatively from a one pass mode to a minimal mode (in which mode, the smallest possible amount of memory is allocated, e.g. of slot size). Similarly, the sort operator may also be set up to operate in one of these three modes, depending on the available memory.

68 Claims, 11 Drawing Sheets

U.S. PATENT DOCUMENTS

| | | | |
|---|---|---|---|
| 2003/0056076 A1 | 3/2003 | Cook et al. | 711/173 |
| 2004/0141650 A1 | 7/2004 | Hansson et al. | |

OTHER PUBLICATIONS

IBM Technical Disclosure Bulletin, IBM Corp. New York, US, vol. 36 No. 12 Dec. 1993, Dynamic Memory Allocation for Multiple Concurrent Sorts, pp. 369-370.

"Microsoft SQL Server 7.0 Storage Engine Capacity Planning Tips", http://msdn.microsoft.com/library/en-us/dnsql7/html/storageeeng.asp. pp. 1-24, Mar. 1999.

N. Kabra, et al., "Efficient Mid-Query Re-Optimization of Sub-Optimal Query Execution Plans", 1998 ACM SIGMOND International Conference on Management of Data, vol. 27, No. 2, Jun. 1998 pp. 106-117.

M. Mehta et al., "Dynamic Memory Allocation for Multiple-Query Workloads", Proceedings of 19th International Conference on Very Large Data Bases, Aug. 1993, pp. 354-367.

L. Bouganim et al, "Memory-Adaptive Scheduling for Large Query Execution", Proceedings of Conference on Information and Knowledge Management, 1998 published by Association for Computing Machinery, Inc., pp. 105-115.

D. L. Davison et al., "Dynamic Resource Brokering for Multi-User Query Execution", published in SIGMOD 1995, pp. 281-292.

L. Bouganim et al., Dynamic Memory Allocation for Large Query Execution, published in Networking and Information Systems, 1(6), pp. 629-652 (1998).

H. Zeller et al., "An Adaptive Hash Join Algorithm for Multiuser Environments", Proceedings of the 16th VLDB Conference, Brisbane, Australia, 1990, pp. 186-197.

H. Pang et al., "Memory-Adaptive External Sorting", Proceedings of the 19th International Conference on Very Large Data Bases, Aug. 1993, Computer Sciences Department University of Wisconsin-Madison, pp. 1-35.

W. Zhang et al., "Dynamic Memory Adjustment for External Mergesort", Proceedings of the 23rd VLDB Conference Athens, Greece 1997, pp. 1-10.

H. Zeller et al., "Hash Join Algorithms in a Multiuser Environment", Technical Report 90.4, Feb. 1990, Part No. 40048, pp. 1-18.

Oracle8i Reference Release 2 (8.1.6), Part No. A76961-01, 1999, pp. 1-5.

Oracle8i Concepts Release 2 (8.1.6), part No. A76965-01, 1999, pp. 1-12.

Oracle8i Utility Release 2 (8.1.6), Part No. A76955-01, 1999, pp. 1-28.

Oracle8i Oracle Tuning Release (8.1.5), Part No. A67790-01-01, 1999, pp. 1-25.

Oracle Technical Report, "Hash Joins Implementation and Tuning" Release 7.3, ACTA Mar. 1997, pp. 1-20.

K. L. Beck, "Memory Allocation in Adaptive External Sorting", Oct. 1993, pp. i-ix and 1-64.

WO 2003/029982 A3 and its International Search Report dated Apr. 10, 2003.

PCT/US02/31223 International Preliminary Examination Report and Written Opinion dated May 18, 2004.

European Office Action dated Mar. 1, 2005 in Application EP 02 800 401.8 - 1243.

European Amendment dated Sep. 12, 2005 in Application EP 02 800 401.8 - 1243.

Chinese Office Action dated Jan. 27, 2006 in Application 02819443.8.

Chinese 1st Amendment dated Jul. 11, 2006 in Application 02819443.8.

European 2nd Office Action dated Feb. 22, 2006 in Application EP 02 800 401.8 - 1243.

European 2nd Amendment dated Jun. 27, 2006 in Application EP 02 800 401.8 - 1243.

European Notice of Allowance dated Dec. 29, 2006 in Application EP 02 800 401.8 - 1243.

Indian Office Action dated Apr. 30, 2007 in Application No: 412/KOLNP/2004.

U.S. Appl. No. 09/969,290 filed on Oct. 1, 2001 by Benoit Dageville et al.

Office Action dated Mar. 29, 2004 by Examiner Hiep T Nguyen in U.S. Appl. No. 09/969,290.

Amendment dated Jun. 29, 2004 in U.S. Appl. No. 09/969,290.

Notice of Allowance dated Oct. 20, 2004 in U.S. Appl. No. 09/969,290.

Amendment dated Jan. 21, 2005 in U.S. Appl. No. 09/969,290.

Office Action dated Jul. 14, 2005 by Examiner Hiep T Nguyen in U.S. Appl. No. 09/969,290.

Amendment dated Oct. 14, 2005 in U.S. Appl. No. 09/969,290.

Office Action dated Dec. 30, 2005 by Examiner Hiep T Nguyen in U.S. Appl. No. 09/969,290.

Amendment dated Feb. 27, 2006 in U.S. Appl. No. 09/969,290.

Office Action dated May 18, 2006 by Examiner Hiep T Nguyen in U.S. Appl. No. 09/969,290.

Amendment dated Aug. 18, 2006 in U.S. Appl. No. 09/969,290.

Office Action dated Nov. 2, 2006 by Examiner Hiep T Nguyen in U.S. Appl. No. 09/969,290.

Amendment dated Feb. 2, 2007 in U.S. Appl. No. 09/969,290.

Office Action dated Jun. 18, 2007 by Examiner Hiep T Nguyen in U.S. Appl. No. 09/969,290.

Amendment dated Nov. 19, 2007 in U.S. Appl. No. 09/969,290.

* cited by examiner

ADAPTIVE MEMORY ALLOCATION

CROSS-REFERENCE TO RELATED APPLICATION

"This application is related to and incorporates by reference herein in its entirety the concurrently filed, copending U.S. patent application, Ser. No. 09/969,290 entitled "DYNAMIC AND AUTOMATIC MEMORY MANAGEMENT" filed by Benoit Dageville and Mohamed Zait."

BACKGROUND

A database available from Oracle Corporation is a relational database that may be installed on a computer (commonly called "server") available from Sun Corporation, running the operating system Solaris. Relational means that the database is composed of various tables (with columns and rows) that can be connected to one another in many ways to view various relationships of the data. A server is a mid-sized computer where all the data are actually kept (it is also sometimes called the host). A server is coupled to various clients. Clients are typically Personal Computers (or "PCs") that pull data off the server in ways that are useful to the user (i.e., for display and interpretation).

A server typically executes a query supplied by a client, and in executing the query applies certain operators (as required by the query) to data in the database. Examples of operators include sort, hash-join and bitmap merge. Each operator requires some space in memory. Portions of memory which Oracle uses to hold data to which an operator is being applied are called work areas. For example, a sort operator uses a work area (a.k.a. the sort area) to perform an in-memory sort of a set of rows. Similarly, a hash-join operator uses a work area (a.k.a. the hash area) to build a hash table from its left (a.k.a. build) input.

Generally, larger work areas can significantly improve the performance of a particular operator at the cost of higher memory consumption. Ideally, the size of a work area is big enough such that it can accommodate the entire input data and auxiliary memory structures allocated by the operator. This is referred to as the "optimal" size of a work area. When the size of the work area is smaller than optimal, the response time increases since an extra pass is performed over all or part of the input data. This is referred to as the "one-pass" size of the work area. When the work area is less than the one-pass threshold, multiple passes over the input data are needed, causing dramatic increase of the operator response time. This is referred to as the "multi-pass" size of the work area. For example, a serial sort operation which needs to sort 10 GB of data needs a little bit more than 10 GB to run optimal and at least 40 MB to run one-pass. If this sort gets less than 40 MB, it will have to perform several passes over the input data.

The goal for a Database Administrator (DBA) is generally to have most work areas running with an optimal size, e.g. more than 90% or even 100% for On-Line Transaction Processing (OLTP) systems, while a smaller fraction of them are running with a one-pass size (e.g. less than 10%). Multi-pass execution should be avoided by the DBA. Even for a Decision Support Systems (DSS) running large sorts and hash-joins, the memory requirement for one-pass executions is relatively small.

In Oracle8i, the maximum size of work areas is externally and statically controlled by the DBA, by setting the following parameters: SORT_AREA_SIZE, HASH_AREA_SIZE, BITMAP_MERGE_AREA_SIZE and CREATE_BITMAP_AREA_SIZE. There is one such parameter per operator that needs a work area.

Setting these parameters can be difficult for a DBA since the maximum work area size is ideally selected based on the data input size and the total number of work areas active in the system. These two factors vary a lot from one work area to the other and from one point in time to another. Thus, the various "*_area_size" parameters are hard to tune under the best of circumstances. For more information on database parameters and their effect on behavior of various operators, see the book entitled "Oracle8i Concepts" available from Oracle Corporation, and on the Internet at http://oradoc.photo.net/ora81/DOC/server.815/a67781/toc.htm (which book is incorporated by reference herein in its entirety).

An MS Thesis by K. L. Beck, entitled "Memory Allocation in Adaptive External Sorting", Oregon Graduate Institute, October 1993 proposes a combination of "adaptive algorithms" that are capable of modifying their behavior to compensate for varying amounts of memory available to them during their lifetime, and a "central agent" to partition memory among concurrent queries. Beck calls this central agent a "memory broker," and proposes a Brokered Adaptive Sorting (BAS) algorithm. In a simple example of the increased performance that BAS can provide, Beck describes two sorts running concurrently, one sorting much more data than the other. If the large sort uses the same amount of memory for its entire duration, it must choose between leaving memory unused for the smaller sort, or crowding the smaller sort out of memory. Beck's solution is to have the large sort use all, or nearly all, of memory when it is available, and to temporarily give up memory during the time that the smaller sort is executing. Beck states that such sorts adjust their memory allocation by checking-in with the memory broker at points when they could change their memory allocation without too much cost. According to Beck, the interactions between queries and the memory broker occurs at "check points" which are points where a query can conveniently change its memory usage. Beck's thesis is incorporated by reference herein in its entirety.

An article entitled "An Adaptive Hash Join Algorithm for Multi-user Environments" by Hansjörg Zeller and Jim Gray, VLDB 1990: 186-197, introduces "a modified, adaptive hash join method that is designed to work with dynamic changes in the amount of available memory. The general idea of the algorithm is to regulate resource usage of a hash join in a way that allows it to run concurrently with other applications. The algorithm provides good performance for a broad range of problem sizes, allows to join large tables in a small main memory, and uses advanced I/O controllers with track-size I/O transfers."

Another article entitled "Dynamic Memory Allocation for Multiple-Query Workloads" by Manish Mehta and David J. DeWitt, VLDB 1993: 354-367, "studies the problem of memory allocation and scheduling in a multiple query workload with widely varying resource requirements. Several memory allocation and scheduling schemes are presented and their performance is compared using a detailed simulation study. The results demonstrate the inadequacies of static schemes with fixed scheduling and memory allocation policies. A dynamic adaptive scheme which integrates scheduling and memory allocation is developed and is shown to perform effectively under widely varying workloads."

The article by Mehta and DeWitt also describes three schemes for allocating memory: "Minimum (allocating the minimum memory required to process the join, namely the square root of the size of the inner relation), Maximum (allocating enough memory so that the join's temporary relation resulting from the selection fits in memory), and Available (allocating whatever memory is available subject to the constraint that the amount of memory allocated is at least the minimum required by the query (i.e. the square root of the size of the inner relation) and no more than the maximum."

See also U.S. Pat. No. 5,799,210 that is incorporated herein by reference in its entirety. This patent discusses in detail a process of "allocating buffer memory for database sort operations" (abstract).

SUMMARY

In accordance with an embodiment of the invention the size of memory used by an operator of an application program is determined based on (1) the memory requirements of the operator, and (2) the size of memory that can be dedicated to the operator (e.g. by the application program). The determination of memory size may be performed dynamically, during execution of an operator (i.e. before completion of processing of input data). Although in one embodiment described herein the application program is a database, in other embodiments other kinds of applications can contain operators that are equipped with instructions of the type described herein to dynamically determine and change their memory usage.

DETAILED DESCRIPTION

Figure 1:
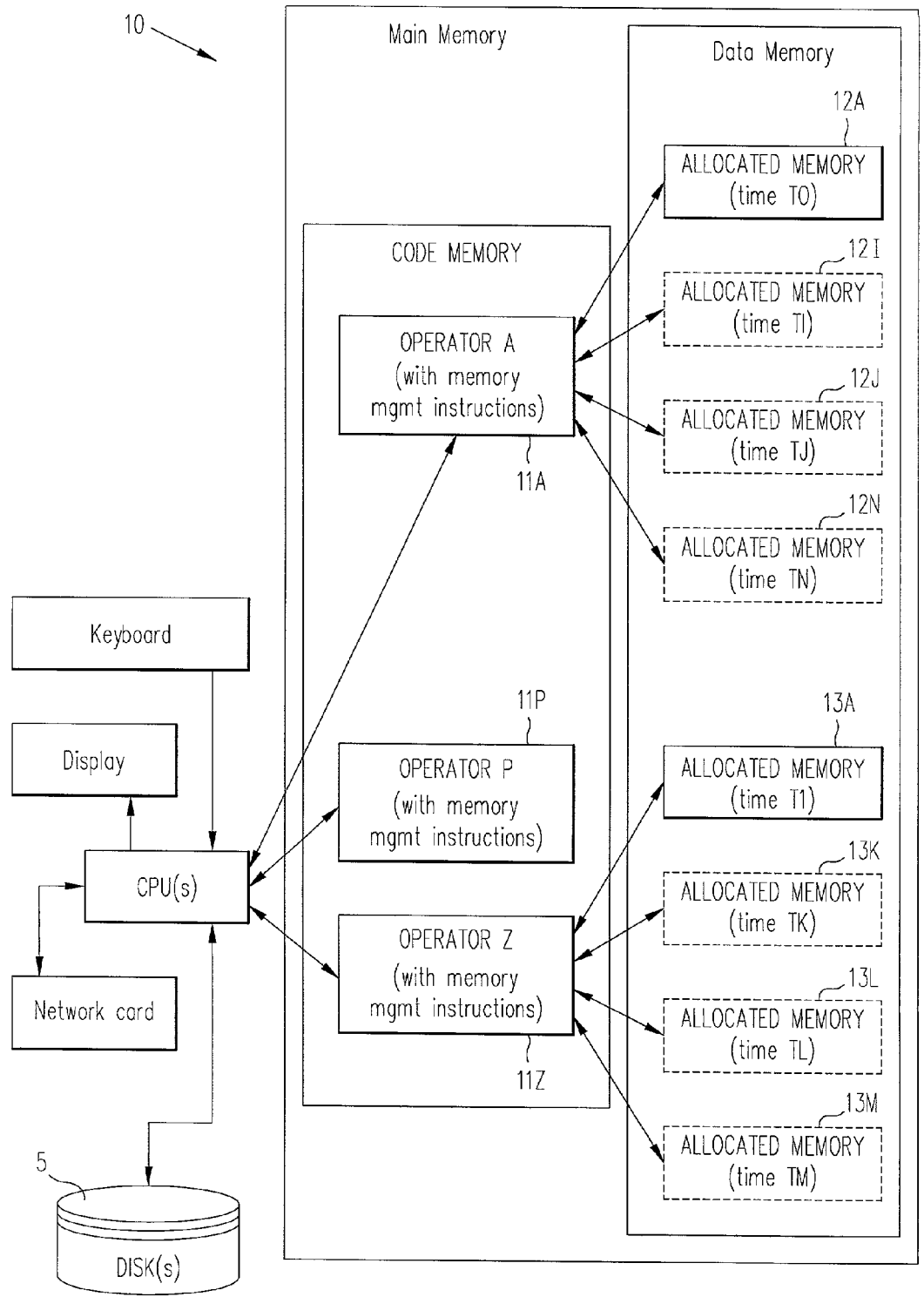
FIG. 1 illustrates, in a block diagram, data and code in memory of one embodiment of the invention.

In accordance with an embodiment of the invention the size of memory used by an operator is determined dynamically based on (1) the size of memory that can be dedicated to the operator, and (2) the memory requirements of the operator (which may depend on the size of input data). The size of memory that can be dedicated to an operator (referred to herein as "memory bound") can be dynamically changed during execution of the operator, for a number of reasons depending on, for example (1) amount of memory available to the application program as a whole, (2) system workload, e.g., other operators active in the system that use work areas, and (3) memory used (or allocated) by other components in the application program.

"For more information on how the memory bound is computed and used, see the related U.S. patent application Ser. No. 09/969,290, entitled "DYNAMIC AND AUTOMATIC MEMORY MANAGEMENT" filed by Benoit Dageville and Mohamed Zait that is incorporated by reference above. Although one way of setting memory bound has been described in U.S. patent application Ser. No. 09/969,290, such a memory bound can be set in any other way, e.g. a memory bound may be set by a Database Administrator (DBA) through a script (which may use time of day or system demand to change memory bound) or through a user interface."

Depending on the embodiment, memory requirements (also called "profile") for each run of an operator may be derived at least partially from the characteristics of data that is input to the operator, for example, the number of rows and the size in bytes. In one implementation, such characteristics are initially built from an estimate, then updated by the operator as it processes its input data. Initial profiles may not be accurate for various reasons, e.g. the original statistics on the input data are out of date, or they are derived (in case the input data is produced by another operator) using an approximate statistical model. One embodiment of the invention overcomes such problems by causing (1) an operator to keep its memory requirements up to date by dynamically updating the requirements based on the size of input data seen so far, and (2) the operator to adjust its memory allocation based on the updated memory requirements and the size of memory that can be dedicated to the operator.

In one embodiment, database operators 11A-11Z (see FIG. 1) (Z being the total number of operators) in a relational database system (of the type available from Oracle Corporation, Redwood Shores, Calif.) are equipped with instructions (called "memory management instructions") to adjust (or adapt), over time, the amount of memory that is allocated and used to process their input data. In one implementation, in deciding the amount to be allocated to itself, each operator 11P (wherein A≦P≦Z) takes into account its profile and the memory bound set by the database system. Operators 11A-11Z (FIG. 1) can be any operator normally used in a database system and that requires a work area (such as sort, hash-join, group by, bitmap merge, bitmap index creation, buffer). Such operators are modified (depending on the embodiment) to dynamically and periodically, or at transitions between phases during their execution, adapt their memory allocation, before continuing to process their input data.

Figure 2:
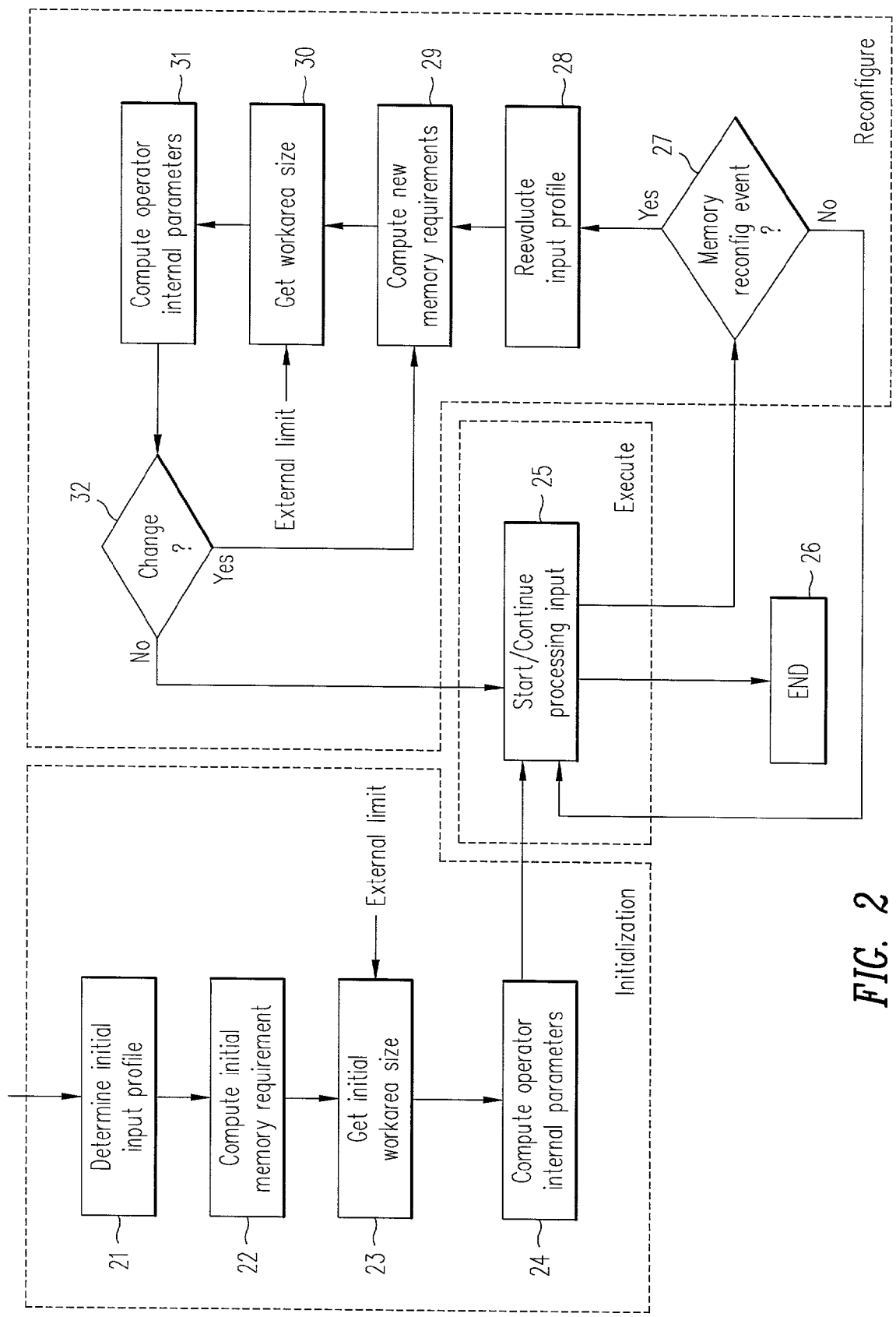
FIG. 2 illustrates, in a flow chart, acts performed by an operator of FIG. 1.

One specific implementation illustrated in FIG. 2 performs the following acts. Specifically, each operator 11P initially determines (see act 21 in FIG. 2) an input profile, based on the estimates of the operator's input data. The input profile is a subset of the estimates that has an impact on the operator performance. The profile is different for each operator, and may be, for example, input size for sort, input size and output size for group-by, input size and number of records for hash-join, and number of records, size and number of distinct values for the index keys for bitmap operators. The estimates are derived by a query optimizer of the database system based on data statistics and a query plan (e.g. hash-join). Alternatively, such estimates may simply use default values that are predetermined (e.g. the default input size of the sort operator is predetermined to be 64K) when the operator can efficiently adapt its execution with minimal performance degradation (e.g. when the operator has been equipped with memory management instructions).

Next, operator 11P computes (see act 22 in FIG. 2) size of memory required for its operation (also called "memory requirements") based on the input profile. The size of memory required by a database operator 11P may depend on a mode (from among a set of pre-defined modes, e.g. optimal, one-pass, and minimum) in which the operator may be run. If so, the size of memory to be allocated by operator 11P may be determined taking into account a function which identifies the performance (e.g. response time) of the operator for a continuous range of memory sizes, from the minimum memory size to the optimal memory size. Operators 11A-11Z need not be limited to the above-described three modes: i.e. such operators may identify only one or two sizes of memory, e.g. if the operators can be executed in only one or two modes respectively.

From the memory requirements and from the memory bound (which is an external memory limit set by the system as described in U.S. patent application, Attorney Docket M-9670 US), the operator determines the size of its work area, as illustrated by act 23 in FIG. 2. Note that determining the size of the work area doesn't mean that this amount of memory is allocated at this time. Instead the work area size is a limit used in act 25 as described below in determining the maximum amount of memory to be allocated.

Operator 11P determines the size of its work area based on predetermined criteria, such as (this is just one embodiment): (a) size should be within minimum and optimal memory requirements, even if the memory bound is less than the minimum (an alternative is to queue the operator until the memory bound (which changes dynamically) becomes greater than the minimum memory requirement); (b) assuming that the external limit is greater than minimum requirement, the operator cannot use more than memory bound; (c) within the constraints set above, operator 11P determines the memory size to use based on a "benefit" (or return on investment) metric, e.g. a function that gives the improvement in response time based on the memory amount used. For example, a sort operator and a group by operator may be programmed to not use more memory than their one-pass memory requirements if the memory limit is less than the optimal memory requirement. This is because response time does not improve in that memory range, for a sorting operator (e.g. sort operator, group by operator, cube operator or window function).

The just-described method of determining work area size is just one embodiment, and in other embodiments other methods may be used. For example, certain embodiments may not use a "benefit" metric, and instead may use the maximum permissible memory in view of criteria (a) and (b). Also, memory bound may be replaced by an "external limit" in the above-described criteria (a) and (b), which external limit is computed from the memory bound, e.g. based on the priority of an operator (e.g. a normal priority operator may set external limit to be same as memory bound and a high priority operator may set external limit to be two times the memory bound).

Once its work area size has been determined, operator 11P computes (see act 24 in FIG. 2) the values of internal configuration parameters which are derived from the work area size. For example: slot size, for hash-join and sort; number of partitions for hash-join. The slot size is the size of a unit of data being input to operator 11P, and may be based on, e.g. direct memory access (DMA) parameters. The partitions of a hash join represent division of input data, to fit into available memory, and the number of such divisions is called "fanout". High fanout can produce a large number of small partitions, resulting in inefficient I/O. At the other extreme, small fanout can produce a small number of large partitions, which will not fit in available memory.

In act 25 (FIG. 2), memory is allocated during processing of input data (in a lazy manner in one embodiment, or everything pre-allocated in another embodiment). During memory allocation, the above-described work area is used as a limit. If the size of the work area is reduced (e.g. in act 30 described below), act 25 reduces the allocated memory, e.g. a sort operator will write a run that is currently in memory (to release previously allocated memory), and start a new run (with the new work area size as a new limit). The processing actually done depends on the operator 11P and on its phase.

Operator 11P processes the input data in its normal manner, as illustrated by act 25 in FIG. 2. If done with processing prior to a predetermined time period, operator 11P exits (due to completion of processing as illustrated by act 26). During act 25, if data in memory is written to disk (and such disk-resident data is referred to as a "run") prior to continuing the processing of additional data, then such a sort operator generates a number of runs of increasingly greater sizes, and must later merge these runs. Alternatively, if the data in memory is not written to disk prior to act 26, operator 11P generates a single run of the size of the input data.

At some point in act 25, operator 11P checks if it needs to reconfigure (see act 27 in FIG. 2). In one embodiment, the check for reconfiguration is performed at convenient locations in the code of operator 11P, which may be done periodically e.g. every minute or after processing 10 rows at a time or between two phases of operator 11P (such as an initial split phase and a later probe phase for hash-join). Alternatively, operator 11P may be interrupted during its processing in act 25 when a predetermined time period has passed. In an alternative embodiment, operator 11P is interrupted by an asynchronous event (which may be monitored by an external process) that forces it to perform the same check (act 27 in FIG. 2). An example of the asynchronous event is that the rate of page swaps exceeds a predetermined limit, and this event may be monitored by an outside process that sends a message to operator 11P.

Regardless of the mechanism used to transition out of act 25, operator 11P may decide to reconfigure its memory for any number of reasons, such as (1) change in memory bound, or (2) if an input profile has changed or (3) if there has been a phase transition. There may be no need to reconfigure memory in act 27, e.g. if the reasons are not present.

In one example, if the input profile specifies that input size is 100 MB, and if operator 11P has already consumed 100 MB but there is more data to process, operator 11P can update the input profile to increase its estimate of input size (for example by adding 20%). The amount of increase may also be simply a fixed increment instead of being a percentage, in alternative implementations. Such increases may also be determined based on heuristics and experiment. Operator 11P can also maintain various statistics (e.g. average row length, number of distinct values of a key), and decide to update the input profile based on such statistics.

As noted above, operator 11P may decide to reconfigure due to phase transition or other event which requires the operator to recompute internal parameters (see act 30 discussed below). For example, a hash join operator may allocate different amounts of memory depending on its phase (such as an initial split phase and a later probe phase). Also, an initial phase can be repeated (e.g. by the hash operator) if necessary, to ensure that the later phase takes less memory than the memory taken with the just-executed initial phase. Alternatively, an operator (such as sort) may change the amount of memory used in the initial phase (although there is no need for a change in the initial phase) to ensure that the runs being generated can fit within memory available in the later phase.

Next, in act 28 (FIG. 2) operator 11P reevaluates (if needed) the input profile based on the input data processed so far e.g. by adding 20% to the current size as noted above. Thereafter, in act 29, operator 11P computes new memory requirements based on the current input profile, the current configuration of the operator (e.g. slot size) and the what has been done so far (e.g. number of runs already produced for sort). For example, operator 11P may (1) evaluate minimum and optimal memory requirements based on the updated input size (in case operator 11P is still in the input phase) or (2) for hash-join, evaluate optimal memory requirement based on the smallest partition while doing the probe phase (i.e. phase 3) or (3) for sort, evaluate the one-pass requirement based on the number of runs produced so far and an estimation of the number of runs that haven't been produced. The one-pass requirement is $2 \times (R_{done} + R_{left}) \times S (R_{done}$=number of runs already produced, $R_{left}$=estimate of number of runs left, S=slot size, and 2 is for asynchronous input-output (I/O)).

Next, in act 30, operator 11P determines the work area size in the same manner as that described above in reference to act 23. Operator 11P also recomputes internal parameters (e.g. slot size for sort, stripe size for bitmap merge) in act 31, based on the newly determined work area size. As described above, act 25 deallocates or allocates memory based on the newly-determined limit on memory size. Thereafter, in act 32, operator 11P checks if internal parameters have changed, and such changes can impact memory requirements. So if there was a change, operator IP executes acts 29, 30, and 31 again (for example, if when hash-join starts, there is a high memory pressure, a minimum memory determines fanout and slot size (such that 2×slot size×fanout<min), and if at the end of the build phase memory pressure reduces then these parameters of fanout and slot size are recomputed). Else, if there was no change, operator 11P continues processing of the input data, based on the new memory configuration, as illustrated by returning to act 25 (until it again needs to check for the need to reconfigure its memory).

Depending on the implementation, the memory allocated in act 31 may physically overlap the memory allocated in act 24 (FIG. 2), or alternatively may be in a different physical location, in main memory 10 (FIG. 1). Process 11P may completely release the memory allocated in act 24 and start over in act 31 (in which case data in memory is written to disk 5), or may simply "grow" or "shrink" the memory allocated in act 24 (in which case the data already in memory need not be written to disk), again depending on the implementation.

In one example, memory management instructions of the type described in the embodiment illustrated in FIG. 2 are added to a sort operator, which is thereafter able to respond quickly to any change in the value of the memory limit set by the system. For example, if a sort is using 50 MB of memory and the external memory limit is changed by the system from 60 MB to 10 MB, the sort will attempt to reduce its memory consumption below 10 MB. Moreover, a sort operator equipped with such memory management instructions increases its memory consumption by a certain amount (deltaM) only if this will result in a decrease of its response time by a certain amount (deltaT), given a memory limit imposed by the system. Therefore, in this embodiment, memory usage is increased only when the sort operator perceives that its response time will decrease. In another embodiment, a maximum value of the ratio deltaM/deltaT could be determined by the system based on the current memory pressure (which is measured in, for example, the rate of page misses).

Figure 3:
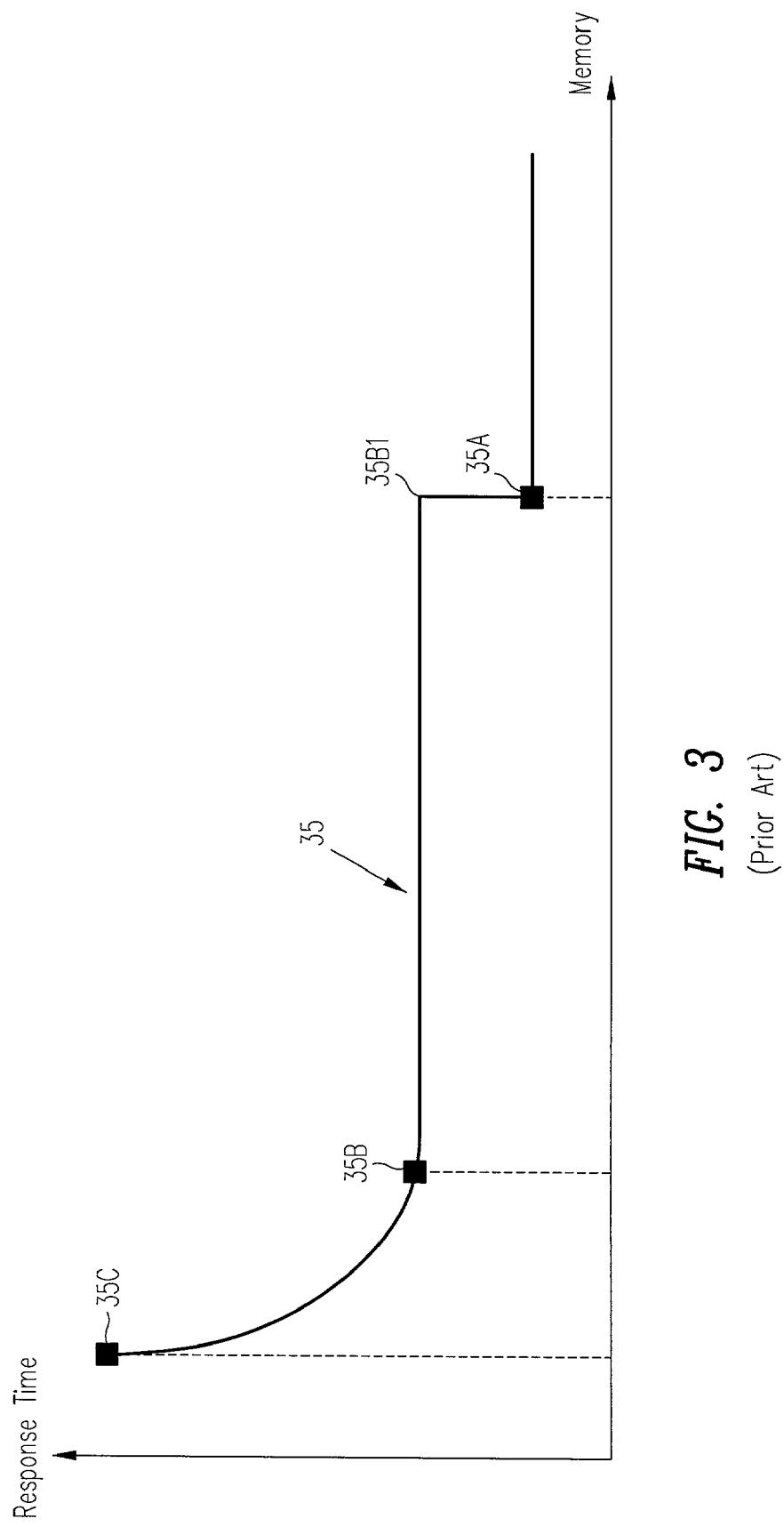
FIG. 3 illustrates, in a graph, the response time of a sort operator of the prior art when using different amounts of memory.

FIG. 3 illustrates how the response time of a sort operator varies with the amount of memory consumed. The shape of curve 35 is comparable from one sort to another. It has three singular points: a maximum point 35A, an intermediate point 35B and a minimum point 35C. Maximum point 35A represents the maximum memory required by the sort operator to get optimal response time. This happens when all the input rows can fit in memory (i.e. Memory=I where I is the size of the input), and the sort operator functions in its optimal mode (also called "cache mode"). The sort operator does not benefit if it is given memory beyond its maximum memory.

Intermediate point 35B represents the memory required for one pass mode. Specifically, if the available memory is less than maximum, the input must be sorted in several pieces (or sort runs) which, once sorted are stored on disk. The sorted runs are then merged together to produce a final result. The one-pass memory point 35B corresponds to the minimum memory required to merge all the sort runs in one-pass. Therefore the memory required is R×S×2 where: R is the number of runs, S is the slot size, i.e. the size of one I/O transfer between disk and memory, and the number 2 is required (this constant factor can be increased on some systems depending on the number of disks that are accessible simultaneously) if the system uses asynchronous I/Os (i.e. one I/O is issued while the result of another is processed).

Between the one-pass memory requirement (illustrated by intermediate point 35B) and up to but not including the maximum memory requirement (illustrated by point 35B1 which in the limit approaches maximum point 35A along the x-axis), the response time is unchanged. So there is no benefit for the sort operator to increase its memory consumption between these two points 35B and 35B1, until a mode change is performed at point 35B1 so that the response time drops as illustrated by point 35A. As a result, if the sort operator cannot run at maximum memory (because an external limit or memory bound is lower), it will attempt to run exactly one-pass and use no more memory for two reasons: (1) because the sort operator does not benefit and (2) to make memory available for other operators that are currently executing.

When the sort operator is using less than one-pass memory, the sort runs must be merged in several passes: a sub-set of the runs are merged to produced an intermediate run and the process is repeated until all runs are merged. Point 35C (FIG. 3) denotes the minimum memory required by the sort operator. This could be a constant (e.g. 64K) or could depend on the input data format (e.g. 2 times maximum possible row length). The sort operator cannot work with less memory than its minimum memory requirement.

One example of a sort operator when modified with memory management instructions as described above in reference to FIG. 2 proceeds in two phases: an input phase where rows from the input data source are fed into the sort operator and a merge phase where sort runs are merged, in one or more passes, to produce one sorted merged output. Note that the second phase only happens if the sort operator cannot run entirely in memory and has spilled runs to disk.

Figure 4:
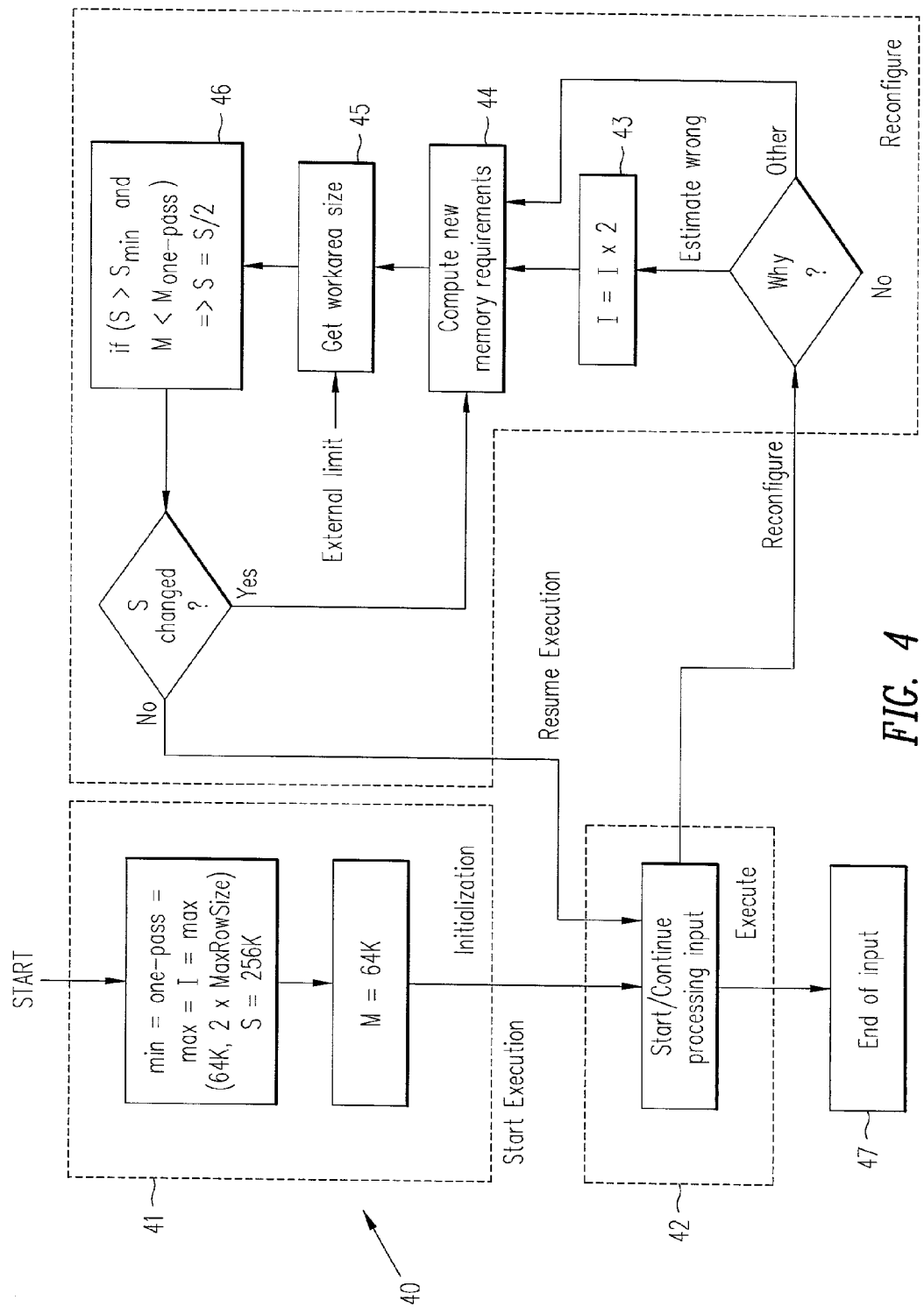
FIG. 4 illustrates, in a flow chart, acts performed by a sort operator to implement the method of FIG. 2.

FIG. 4 illustrates, in a high level flow chart, a method 40 used by such a sort operator (in one implementation of the method of FIG. 2) during its input phase. Specifically, in act 41, the sort operator performs initialization by setting minimum memory requirement to 64K or 2 times the maximum row size (MaxRowSize), whichever is larger. The sort operator also sets one-pass=max=min, slot size=256K and I=min (I is the estimated input size). The slot size is initially the largest possible size of 256K, which is later changed to a smaller size of 64K if necessary to reduce memory usage. The sort operator further sets initial memory size to minimum and maximum (which are same at this point). Thereafter, in act 42, the sort operator performs processing of input data, and also keeps track of the size of the input data. When the actual input size becomes larger than the estimate input size I or when the memory used becomes larger than the system limit, the sort operator reconfigures its memory as described next.

Specifically, in act 43, the sort operator increases input size estimate. This act 43 is performed only when the reconfigure act is triggered because of a bad input size estimate. In this case, the sort operator grows the current estimate by some factor, for example 2 (i.e. new I=I×2). A smaller growth factor (e.g. 1.2) can add some overhead in this method, because it will take more time to converge. On the other hand, the final estimate size will be on average closer to the real size (which is the size needed had the actual input data size been known).

Thereafter, in act 44, the sort operator recomputes memory requirements: e.g. recomputes all memory requirements based on the newly-determined input size estimate I and the current slot size S. For example, the sort operator may use the following criteria. Note that the sort operator initially starts in the optimal mode, and when its estimate for optimal mode exceeds the memory bound, the sort operator spills to disk and switches to one pass mode.

For minimal mode, when the sort operator is about to spill to disk, min is changed to 8 slots size (i.e. min=8×S). 8 slots is the minimum memory amount required, e.g. 4 slots to read and write a run to disk and 2 slots for each run to merge two runs.

For one pass, memory requirement is set to $2 \times (R_{done} + R_{left}) \times S$. $R_{done}$ is the actual number of runs already produced on disk. $R_{left}$ is the remaining number of runs to produce. $R_{left}$ is computed to achieve minimum one pass memory requirement such that:

$$R_{left} = I_{left}/M \quad (a)$$

$$M = 2 \times (R_{done} + R_{left}) \times S \quad (b)$$

In equation (a), $I_{left}$ is the size of the input which remains to be consumed. If $I_{done}$ represents the size of the input already processed and I the estimated input size, we have:

$$I_{left} = I - I_{done}.$$

From the above equations (a) and (b), we can derive a second-degree equation based on $R_{left}$:

$$R_{left}^2 + R_{done} R_{left} - \frac{I_{left}}{2S} = 0 \Rightarrow R_{left} = \frac{-R_{done} + \sqrt{R_{done}^2 + \frac{2I_{left}}{S}}}{2} \quad (c)$$

The above equation (c) is used to compute the ideal number $R_{left}$ such that we minimize memory consumption to run one-pass. The one-pass memory is then derived from this number, i.e. one-pass=$2 \times (R_{done} + R_{left}) \times S$.

For the optimal mode, if the sort operator has not yet spilled to disk, the maximum memory requirement is the memory required to sort everything in-memory, maximum=I. But if the sort operator has spilled to disk, then there is no benefit in getting that much memory so maximum is set to the one-pass memory. In other words, as soon as the sort operator spills to disk, it will use at most one-pass memory.

Next, in act 45, the sort operator determines the ideal memory size M from the new memory requirement and the external memory limit. For example, the sort operator may get the ideal amount of memory to use as follows: M=maximum if external limit>maximum, M=one-pass if external limit>=one-pass and <maximum, and M=external limit if external limit<one-pass.

Thereafter, the sort operator adjusts the slot size, in act 46, because the sort operator performs read and write operations which are normally performed by the sort operator to read/write sorted runs from/to disk, but these are now performed using the newly-sized I/O slots. Higher slot size generally means less I/Os which leads to better performance. On the other hand, the one-pass memory requirement is proportional to the slot size. So, if the slot size is too big and the external memory limit too low, it might happen that big slot size causes the sort operator to run in several passes (i.e. M<2×R×S). This could significantly increase the response time of the sort operator.

A sort operator when equipped with the memory management instructions automatically reduces the slot size when it cannot run one-pass. The slot size S is adjusted if M is less than the one-pass requirement and S is larger than $S_{min}$ (minimum slot size). Adjusting S can be simply done by reducing S by one I/O unit (a block, e.g. 4 KB) or by dividing S by a constant factor (e.g. 2). Once S has been adjusted, the sort operator needs to reconfigure again starting at act 44 (described above).

In act 47, the sort operator reaches the end of input data. The above-described acts (from act 42 to act 46) are repeated until all the input data has been consumed by the sort operator. Once this phase is finished, the sort operator enters into a merge phase described below. The merge phase is only performed if the sort operator cannot run in-memory.

Once the input phase of the sort operator is completed, the merge phase starts. The merge phase of the sort operator may have one or more merge passes as follows:

1. Determine maximum memory requirement $M_{max}$: $M_{max}$=R×S×2. R is the number of remaining runs that need to be merged, S is the slot size.
2. Get memory M to use for the current merge pass: M=$M_{max}$ if $M_{max}$<external limit else M=external memory limit
3. If M<$M_{max}$ and S>$S_{min}$, reduce S (e.g. S=S/2) and go to step 1.
4. Determine the number of runs that can be merged with memory M:
   N=Int(M/(2×S))
5. If N<R. merge N runs into one larger run that will be spilled to disk. S=$S_{max}$, R=R−N. Then start another merge pass by restarting execution at step 1.
6. If N≧R, then all the runs are merged (last merge pass) and the result is returned as it is produced (the last run is not stored on disk).

In one example, a sort operator is about to sort 100 MB of data and that the external memory limit is 4 MB. To simplify the example, we assume that the external limit (or memory bound) remains constant throughout the execution. The sort operator starts the execution assuming an initial size for the input of 64 KB, derives the memory requirements for maximum, one-pass, and minimum.

Given the memory requirement for maximum (64K) is less than the memory limit the sort operator allocates up to 64 kbytes of memory space and starts processing its input data. When the sort operator consumes 64 kbytes of data it "realizes" that the input estimate is not correct. As a result, it will: adjust the input estimate to 128 kbytes (multiply by 2), recompute the memory requirements based on the new input estimate, and compute the memory size it can allocate: since the maximum requirement is less than the memory limit it allocates 128 KB.

Figure 5:
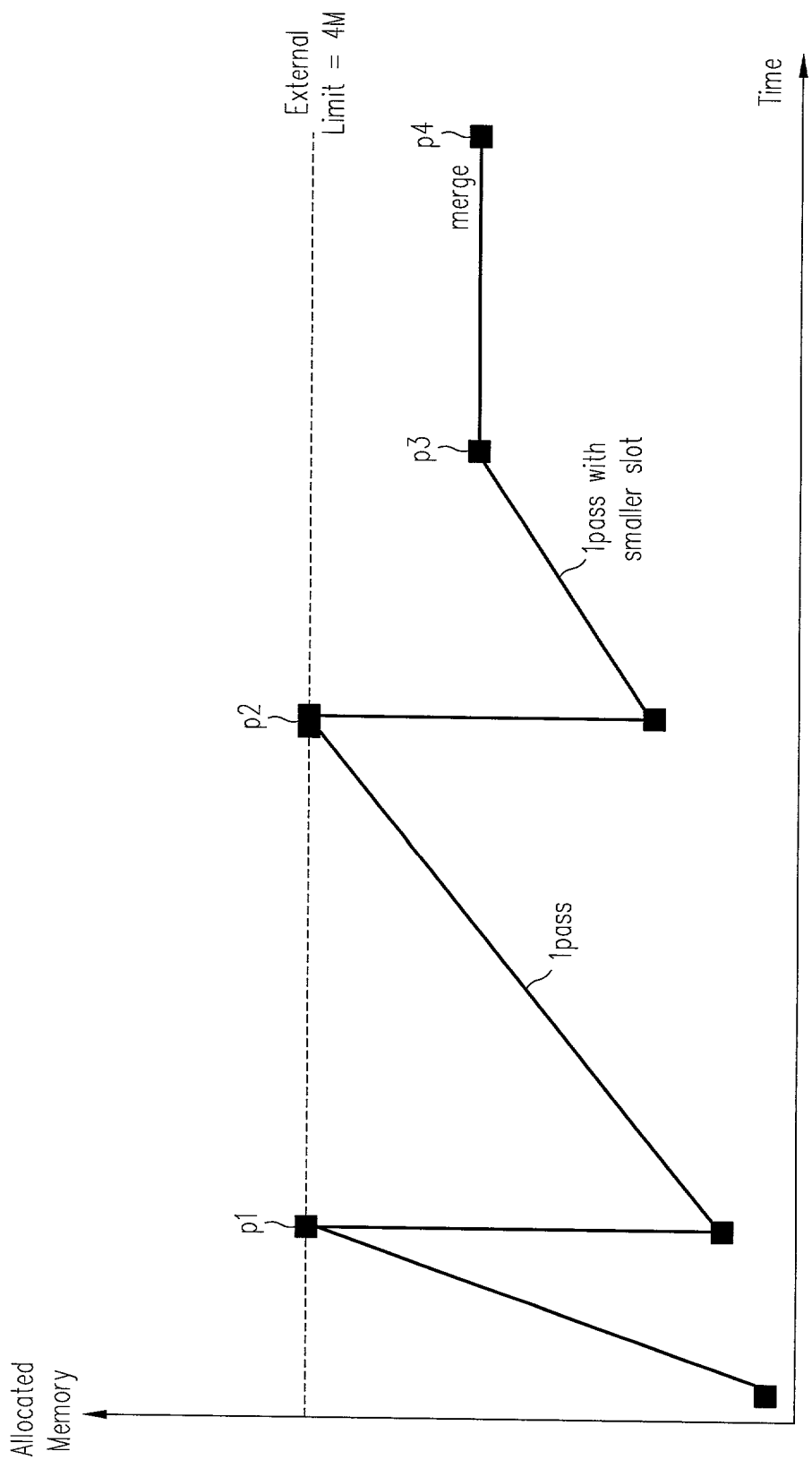
FIG. 5 illustrates, in a graph, the amount of memory allocated during execution by a single sort operator that performs the method of FIG. 4.

This process is repeated several times till the cache memory requirement exceeds the memory limit (refer to point p1 on FIG. 5). When this happens, the sort operator writes the data sorted so far to disk, and, creates the first sort run. From now on the sort operator operates in the one-pass mode. The reason is that the sort operator doesn't benefit from additional memory above the exact one-pass memory requirement, as noted above in reference to FIG. 3.

The sort operator uses the one-pass memory requirement as long as the memory in use is smaller than the memory limit. The one-pass memory requirement is adjusted as the input data is processed and the input size readjusted. As a result, between point p1 and p2 on FIG. 5, sort runs are produced and their size is increased to respond to the increase in estimated input size. When the amount of memory used becomes again higher than the memory limit (refer to point p2 on FIG. 5), the slot size is reduced by some amount and the one-pass memory requirement drops as a result.

The above-described process is repeated until the memory limit and the entire input data has been processed (refer to point p3 on FIG. 5). At this point, the input data is exhausted and the sort operator starts merging (from point p3 to point p4 on FIG. 5) the sort runs which have been produced during the input phase. Because the memory has been adjusted during the execution, the memory consumed at that point should be very close to the one used at time p3 (i.e. $M=2\times S \times R_{done}$ where S is the final slot size and $R_{done}$ the number of runs that have been produced).

In this example we assumed that the external limit remained constant throughout the execution. If the external limit is changed, the sort operator (which has been equipped with memory management instructions) immediately reacts, to conform to the new limit. For example, if the external limit is lowered between point p1 and p2, the sort operator reacts by reducing its slot size to achieve one-pass with less memory. Similarly, it is possible for a sort operator to run one-pass instead of multi-pass if the memory is increased during the merge phase. Steps 3 and 4 described above for the merge phase are used to dynamically expand the allocated memory to adjust its size to the current input size and the current slot size. Adjusting the size of the sort area ensures that a minimum amount of memory is used to run in one-pass mode.

In the above process, if the memory was not adjusted, the sort operator will have produced 100 MB/64 KB=1600 runs. This would require 200 MB of memory to merge in one-pass assuming a 64K slot size (2×1600×64). In one embodiment, the sort operator initially allocates a minimum amount of memory (e.g. a fixed amount, such as 64K which is one slot size), and thereafter dynamically adjusts the allocated amount upwards as appropriate.

In an alternative embodiment, the sort operator uses an estimate generated by the query optimizer to determine the amount of memory to be initially allocated. But the query optimizer's estimate is often wrong, especially if the sort operator is applied to the output of a complex query. For example, the optimizer could estimate that the input data size for a sort operation is 100 MB while in reality it is only 20 MB. It that case, if the external limit is set to 30 MB, the sort operator will spill to disk right away since it will assume that it cannot run in the optimal mode (i.e. 100 MB>30 MB). Running one-pass instead of optimal mode significantly increases the response time. Also, the one-pass memory used will be based on an input estimate of 100 MB which will cause the sort operator to use more memory for one-pass than the one really required.

Using a small value (e.g. predetermined to be 64K or one slot size) as an initial estimate of input ensures that the sort operator runs in optimal mode if it can (i.e. when I<external memory limit). Also, the one-pass memory requirement is frequently (e.g. more than 80% of the time) very close to (e.g. within 20% of) the ideal one-pass memory requirement. The ideal one-pass requirement is the minimum amount of memory required to run one-pass knowing the real size of the input. This one-pass memory is sqrt($I_{real} \times S \times 2$). The one-pass memory requirement used by the sort operator when starting with a small input size (e.g. 64K) is very close to (e.g. within 20% of) this ideal.

Consider an example where the input size is 850 MB and the external limit is set to 50 M. Once the sort operator has consumed 50 M of input data (800 M are left), it will spill the first run to disk and start a one-pass execution. At that point, $I_{estim}=100M$ which is 8 times off compared to the remaining input size. When the sort operator starts to produce the second run, it sizes the sort area based on the estimated 50 MB input size still left. This gives $R_{left}=10(R_{done}=1)$ so the sort area is resized to 5.5 MB assuming 256 KB slot size (i.e. $M=2\times(R_{left}+R_{done})\times S$).

Once 100 MB of input data has been consumed, which corresponds to 10 runs (the initial 50M run plus 9 runs at 5.5 MB), the sort operator uses a predetermined criterion, e.g. to postulate that the estimate input size is two times off, and assumes a new estimate of 200 MB instead of 100 MB. Based on this new estimate, $R_{left}$ is recomputed ($R_{left}=10$) and the sort area is resized accordingly to 10 MB. The same technique is repeated again and again until all rows from the input are consumed.

When the merge phase is first started, it needs to merge 1 run of 50 MB, 9 runs of 5.5 MB each, 10 runs of 10 MB each, 12 runs of 16.5 MB each, 16 runs of 24.5 MB each and 2 runs of 35 MB each. This represents a total of 50 runs instead of an "ideal" number of 40 runs had it been known from the beginning that the remaining input size was 800 MB. These runs are merged in one-pass using a merge area of 25 MB (2×50×256 KB). This is slightly more memory than the 20 MB (2×40× 256 KB) required for a one-pass merge of 40 runs, the ideal number of runs.

Generally, assuming that the estimated size of the sort input $I_{estim}$ is off by at most a factor of $2^n$ compared to the real input size I (i.e. $2^{n-1}I<I_{estim}<=2^nI$), one can demonstrate that the final number of sort runs $N_{final}$ will be:

$$N_{final} = \left( \frac{1 - \left(\frac{1}{\sqrt{2}}\right)^2}{2-\sqrt{2}} + \left(\frac{1}{\sqrt{2}}\right)^n \right) \times N$$

where N is the ideal number of runs for the real input size I (i.e. N=sqrt(I/S)).

In the above example, the sort operator was 8 times off so n is 3. Using the above formula, one can compute that a sort operator will produce 1.45 times the ideal number of runs N. It means that the one-pass merge phase will consume 1.45 times the ideal memory N×S×2. When n is 1 (2 times off), this factor is 1.2 and when n is infinite, this factor converges to 1/(2sqrt(2)) which is 1.7. So the extra memory consumption is limited to 70% in the worst case during the merge phase. Also, if we consider the memory consumption during the entire sort, it is slightly less because runs are produced using less memory than the ideal memory.

Without the just-described technique, doing a one-pass merge would require $2^n$ more memory than the ideal memory. In terms of memory consumption it is even worse than this because the duration of the merge pass is proportional to the number of runs. Without adapting the size of the sort area dynamically, a sort operator will produce many runs thus increasing the duration of the merge phase, which increases memory consumption even more. (Memory consumption=duration of allocation×memory allocated.)

Although modification of a sort operator has been discussed above in reference to FIG. 2, the method illustrated in FIG. 2 can also be used to modify other operators, such as bitmap merge operator and hash join operator. Similarly to the sort operator, the response time of a bit map merge operator depends on how much memory is available. However, the response of bit map merge does not have the flat horizontal region preceding a vertical drop at the optimal memory estimate as illustrated in FIG. 3. Instead, there is an asymptotic drop in response time, similar to that for hash join (FIG. 7) except that there are no steps in case of bit map merge.

A bitmap index merge operation is normally used to merge multiple bitmap streams corresponding to different key values into a single bitmap stream. For example, consider the following query which returns information about male employees hired after a specific date ('06-29-1996'):

SELECT*FROM employee WHERE hiredate>'06-29-1996' and gender='MALE';

Also, assume there is a bitmap index on the hiredate column and another bitmap index on the gender column. One way to execute this query is as follows: first, for the bitmap index on the hiredate column, the execution engine needs to retrieve and merge the bitmaps for each distinct value of the hiredate column greater than the date '06-29-1996'. The resulting bitmap can then be ANDed with the bitmap produced for the value 'MALE' in the gender bitmap index. Finally, the rowid's are extracted from the bitmaps to fetch the records from table employee.

For optimal performance, the bitmap merge operation requires that there is enough memory to store the individual bitmaps plus the bitmap resulting from the merge. Otherwise, it needs to split the bitmap streams into smaller stripes so that the total memory needed to store one such stripe per distinct value is less than the available memory. The merge operation is repeated for the next set of stripes till all stripes have been processed.

Figure 6:
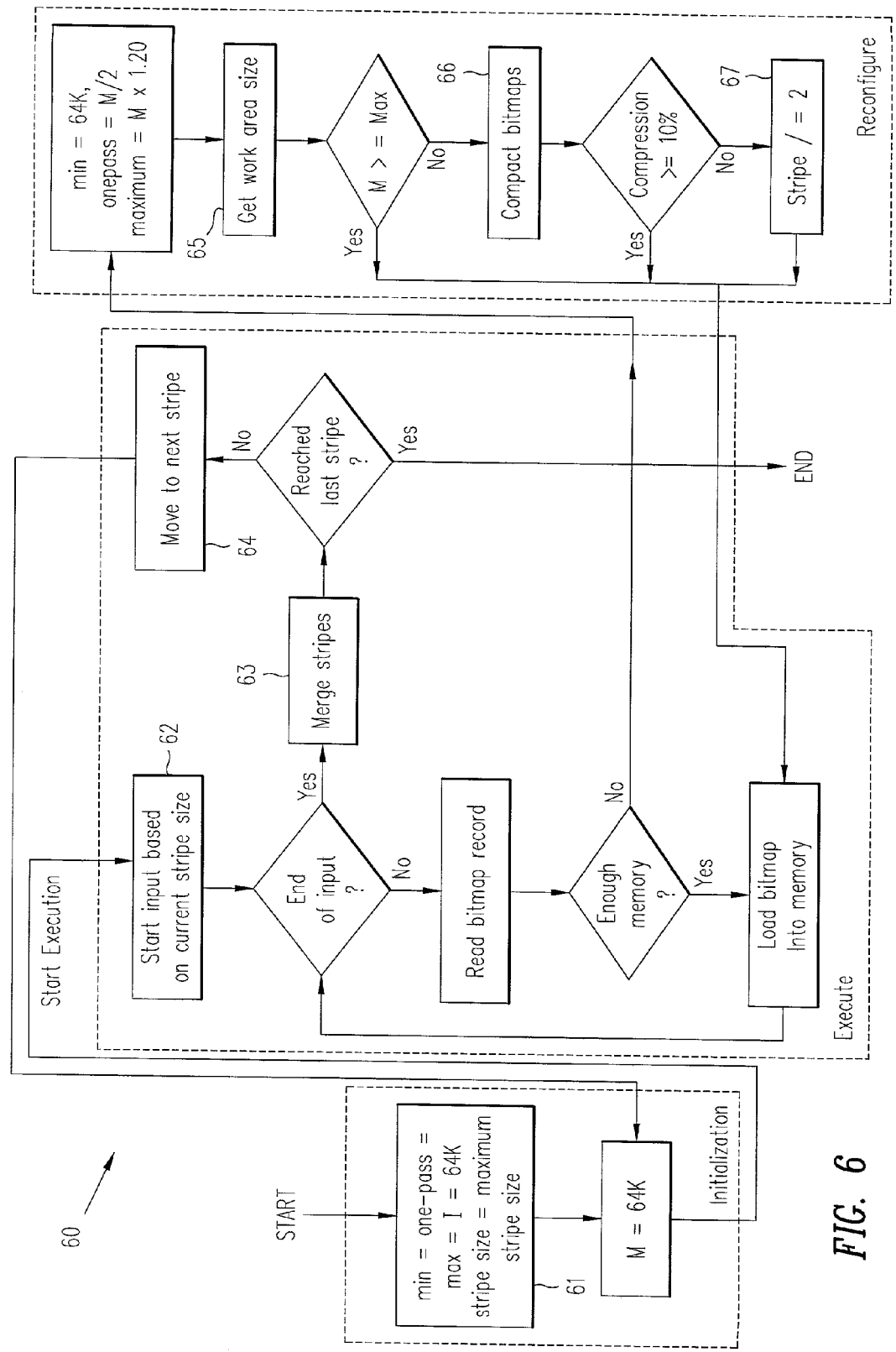
FIG. 6 illustrates, in a flow chart, acts performed by a bit map merge operator to implement the method of FIG. 2.

A bitmap merge operator when modified with memory management instructions, performs a method 60 that is illustrated in FIG. 6. Specifically, in act 61, the bitmap merge operator initializes a number of parameters, e.g. sets minimum memory requirement to 64K, sets one-pass memory estimate=max memory estimate=min memory estimate=I (wherein I is the estimated input size), sets initial memory size to 64K, and sets the stripe size to the maximum stripe size. Next, in act 62, the bitmap merge operator starts processing the input data based on the current stripe size, i.e., reads only that portion of the bitmap that is relevant, and iterates over the input till there is no more data to read. The bitmap record read is loaded into the merge work area. Next, in act 63, in case the bitmap merge operator reaches the end of the input, it merges all the stripes that have been read. In act 64, in case the bitmap merge operator still has stripes left then it moves to the next one and re-starts the processing again.

In act 65, if the bitmap merge operator doesn't have memory to load the current bitmap record, it sets the maximum memory requirement as the current memory times a predetermined factor, e.g. 1.20 and asks the memory broker how much memory the bitmap merge operator can use, with a hope to get the maximum memory requirement. In case the bitmap merge operator gets the maximum memory requirement then it resumes processing. In act 66, if the bitmap merge operator doesn't get enough memory, then it tries to free some memory in the merge work area by compacting the bitmaps. In act 67, if the compaction factor is more than a predetermined factor, 10%, then it resumes the read-load process, otherwise it reduces the stripe size by a predetermined factor in act 67, e.g. by half, which frees half the work area, and then it resumes processing.

A hash join operator may also be equipped with memory management instructions as described above in reference to FIG. 2. Specifically, the hash join operator may be programmed to reconfigure if necessary after its build phase, and if reconfiguration is necessary, the build phase may be repeated prior to starting the next phase which can be a probe-join phase.

The hash join operator of one embodiment has the following three phases: build phase, probe-join phase and probe phase. In the build phase, a left input (also called "build input") of the hash-join operator is split in F partitions using a hash function applied to the join key. F is called the fanout of the hash-join and is selected based on the size of the build input and the available memory.

Once the build input has been entirely read and split into F partitions, the probe-join phase (also called "hybrid" phase) starts. First, the hash-join operator determines which partitions of the build input can fit in-memory (a number $B_m$ which varies from 0 to F). If $B_m$ is not 0, those partitions are loaded in memory and a hash-table is built using their rows. Then the hash-join operator can start to process the right input (also called "probe input") of the hash-join. For each probe row, it determines which build partition could match that row by applying the same hash function used to split the build input. If the matching partition is in memory, the hash-table is used to probe all the matching rows of the build input. These rows are immediately returned as they are probed in case they verify the join predicate. If the matching build partition is on disk, the probe row is inserted in a corresponding probe partition which is spilled to disk. This process is repeated for all rows in the probe input.

The probe phase is only performed if $B_m$<F. In this case the hash-join operator has to finish the join between each remaining pairs of build and probe partitions that have not yet been joined because not enough memory was available during the hybrid phase. Those partitions have been stored on disk. When this phase is starting, we have F–$B_m$ partition pairs to join. For each pair, the hash-join determines the smallest of the two partitions, loads it into memory, builds a hash-table on it. Then it returns all matching rows by probing the hash-table with all rows from the other partition (the one left on disk). When the smallest partition does not fit in memory, a recursive hash-join between the two partitions is executed. This process is repeated until all partition pairs have been joined.

Figure 7:
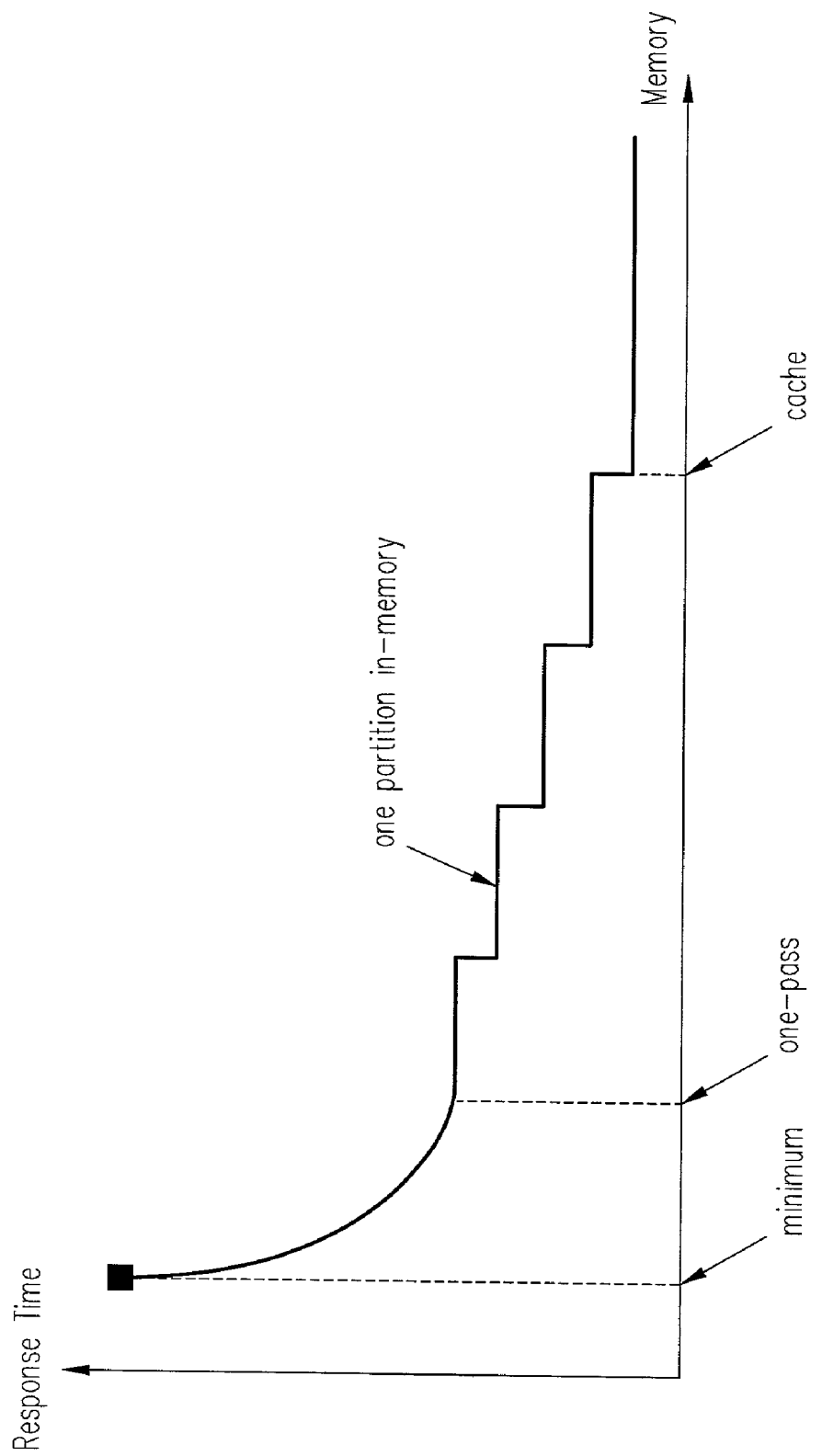
FIG. 7 illustrates, in a graph, the response time of a hash-join operator of the prior art when using different amounts of memory.

Similarly to the sort operator, the response time of a hash-join operator depends on how much memory is available as illustrated in FIG. 7. The curve in FIG. 7 shows the global shape of the response time curve with memory utilization. Like the sort operator's response curve in FIG. 3, the hash-join operator's response curve in FIG. 7 has three singular points: maximum, one-pass and minimum. The maximum point corresponds to the amount of memory required to entirely cache the build in memory plus whatever memory is required to build a hash-table on the build rows. At this point, $M_{max}$=I+O where I is the build size and O is the overhead for the hash-table (and other structures used by the hash-join).

The one-pass memory is the minimum amount of memory needed to load one build partition and build a hash-table on it. Adding more memory (i.e. increasing memory from one-pass to maximum) allows more build partitions to fit in memory. Each additional build partition that fits in memory speeds up the hash-join processing time since all probe rows matching this partition can be directly returned instead of being spilled to disk to be processed later during the last phase of the hash-join. This explain the steps in the response time between the one-pass and the optimal memory requirement (refer to FIG. 7). Each step in FIG. 7 corresponds to an additional build partition loaded in the hash-join work area.

When the hash-join operator uses less memory than one-pass, it means that one partition as a whole cannot fit in memory. As a result, each partition has to be processed in several passes during the last phase of hash-join (e.g. recursive hash-join). A commonly used technique is to run a recursive hash-join between the two partitions. This involves another split of the probe and the build. These extra passes adversely impact the response time. The minimum memory requirement for the hash-join operator is implementation specific and depends on the phase of the hash-join operator. It can be a constant (e.g. 64K) or the minimum amount of memory needed to fit one row from the build input and one row from the probe input.

In one embodiment, the hash-join operator starts in optimal mode, with the assumption that the build table will fit in the allocated memory. Note that the memory allocated by the hash-join operator at the beginning is determined by an initializer which can be, for example, a query optimizer in the database. However, even when operating in the optimal mode, the hash-join operator of this embodiment partitions the build input data into F partitions, based on one-pass requirement, to allow switching to the one-pass mode if the memory bound reduces.

Initially, when the hash-join operator starts the build phase, it first needs to determine the appropriate value for the fanout (F) and the I/O slot size (S). These values depend on the estimated input size I and the maximum amount of memory (e.g. limited to memory bound) which is available when the hash-join operator is started.

Figure 8:
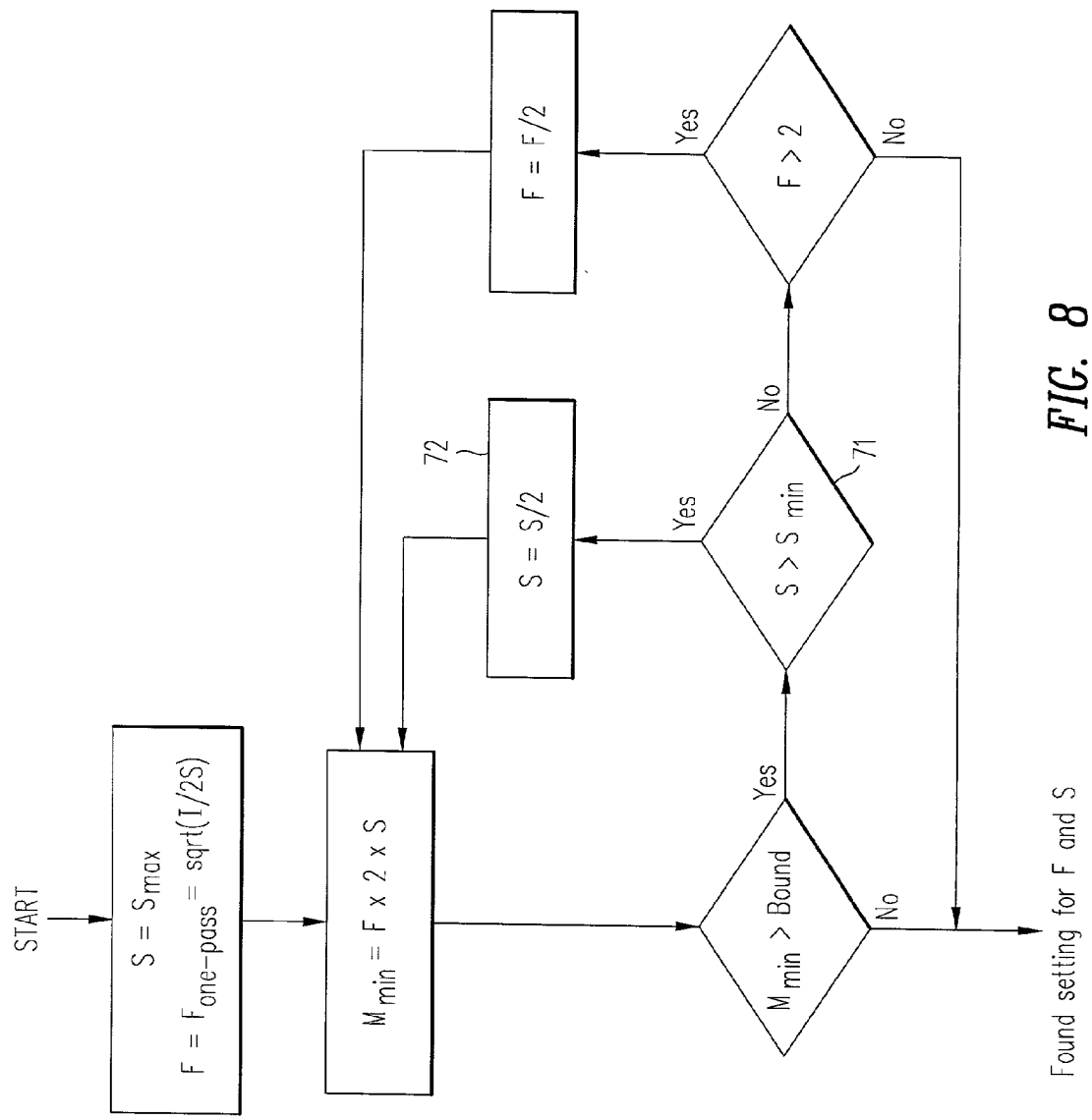
FIGS. 8-10 illustrate, in flow charts, acts performed by a hash-join operator to implement the method of FIG. 2.

So, initially, F is set to the one-pass fanout which is sqrt(I/2S) and S to the maximum I/O size (e.g. input 256K), as illustrated in FIG. 8. Based on these settings, the minimum memory requirement to split the build input and the probe input is $M_{min}=2 \times S \times F$. If $M_{min}$ is larger than memory bound, then the initial settings for F and S are decreased until $M_{min}$ becomes less than bound or both S and F have reached their minimum value (i.e. $S=S_{min}$ and F=2). This embodiment favors running one-pass versus having large slots by testing if S has reached $S_{min}$ and decreasing S first (as illustrated by acts 71 and 72), F is only decreased when S has reached its minimum value $S_{min}$.

Figure 9:
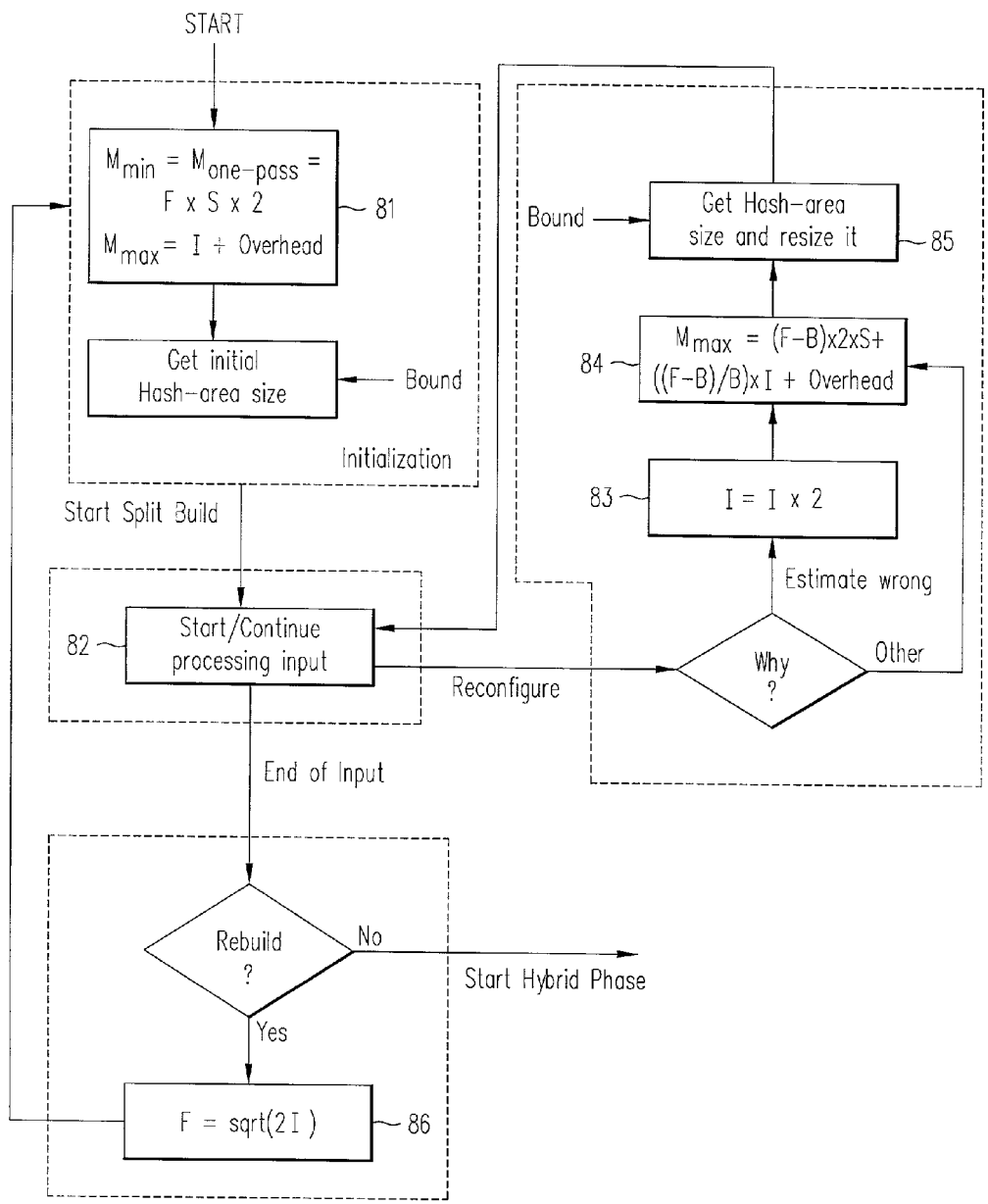

Once S and F are computed, splitting the build can start. FIG. 9 depicts the general memory adaptive method for hash-join operator and has the following steps. Initially, in act 81, the method computes the memory requirement based on F, S and the input size I. I is either an estimate from the query optimizer or a known value based on a prior build (see step 86 below). Because F and S cannot change during that phase, the minimum and one-pass memory requirements are the same: 2 slots per partitions. The minimum memory requirement could have been one slot per partition without asynchronous I/Os. Maximum memory requirement is the memory required to fully load the build input plus the memory used for control structures like the hash table which is built at probe time.

Next, in act 82, splitting the build input is started/resumed. Input rows from the build input are consumed and inserted into their corresponding partition. Each partition is either loaded in memory or has been spilled to disk. Spilled partitions have only their last slot in memory. When this last slot is full of rows, it is written to disk (asynchronously) and replaced by an empty slot allocated from the hash-join work area. During asynchronous I/O at least two slots are used, one to perform the output while the other is filling. During synchronous I/O, the same slot is used for writing to disk and also is filled in after writing to disk, so that an extra slot is not required.

A memory reconfiguration action (see acts 83-85 described next) is performed during the build act 82 based on: a time-out triggered every n seconds (e.g. n=60) or every n' rows (e.g. n'=1000) and also when the input size (I) is larger than previously estimated.

In act 83, if a memory reconfiguration happens because the estimated build size (I) is too small compared to the actual build input seen so far, I is readjusted by multiplying its value by a certain coefficient (e.g. 2). I is left unchanged if the memory reconfiguration happens for other reasons. In act 84, the maximum memory requirement is reevaluated at this step. Once a build partition is spilled to disk, it is not reloaded into memory during the build phase. Assume that B is the number of in-memory partitions, then F−B is the number of spilled partitions. For each spilled partition we need 2 slots (i.e. a total of (F−B)×2×S). To this value, we need to add some memory to store the in-memory partitions (i.e. a total of I×(B/F) assuming no data skew). Then, we need additional memory used for control structures like the hash table.

In act 85, the hash-join work area is then sized based on the available memory (the bound) and the new maximum memory requirements (which has been recomputed in the above step). If the size of the hash-join work area is reduced, resizing will involve spilling some build partitions from memory to disk such that the memory consumed conforms to the new size. Once the resizing operation has been performed, the build can be resumed by going to act 82.

Figure 10:
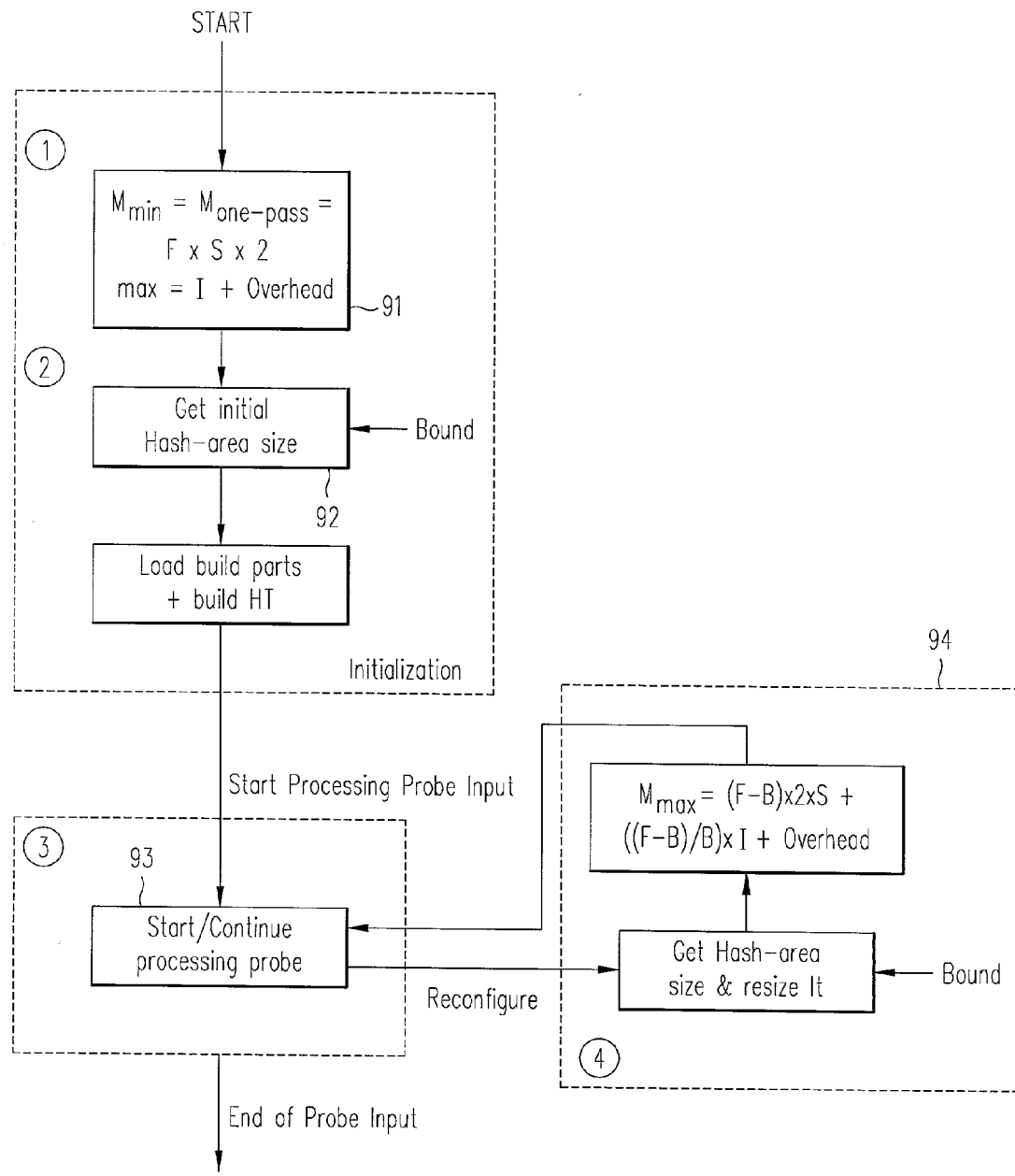
Figure 11:
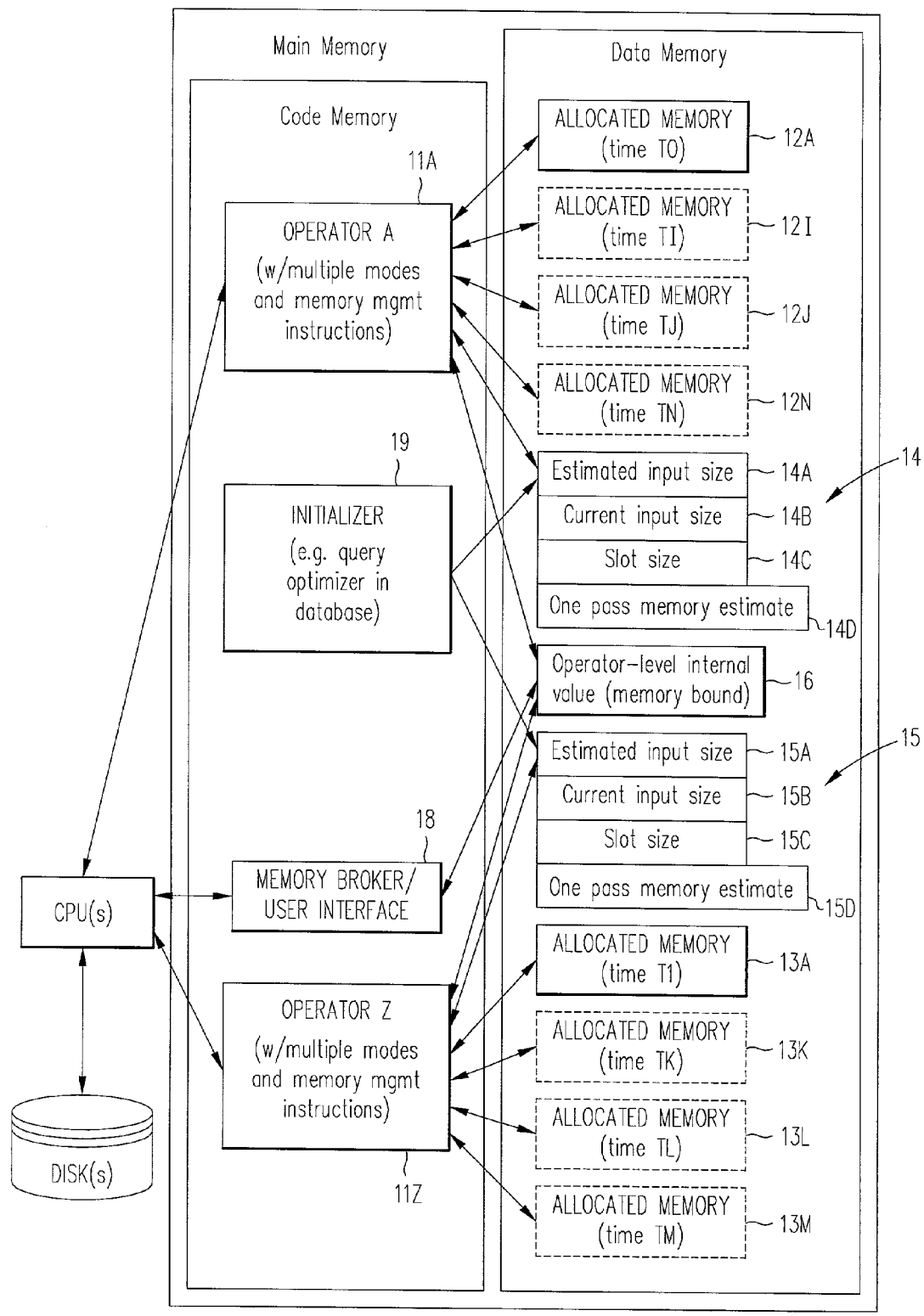
FIG. 11 illustrates, in a block diagram, data and code in memory of one implementation.

In act 86, the first build terminates once all the rows from the build input have been consumed, and the next phase (FIG. 10) may be started. However, at that point, the real input size I is known and the hash-join can determine if the fanout F is optimal (i.e. if $F_{optimal}$=sqrt(I/2S)). If F is much smaller than $F_{optimal}$ (e.g. more than 2 times off), the hash-join operator may be programmed to rebuild, e.g. split again the build input into $F_{optimal}$ partitions. This rebuilding step is not mandatory and just performed as an optimization to limit the amount of memory required to run one-pass in the next phase. This is because the one-pass memory requirement is the amount of memory required to load at least one build partition in memory. The size of one build partition is I/F.

The hybrid phase of the hash-join operator (FIG. 10) splits the probe input and immediately joins the probe row when its corresponding build partition is kept in memory. Probe rows that are not immediately joined are spilled to disk. Specifically, in one embodiment, the hash-join operator computes (act 91 in FIG. 10) its memory requirement based on fanout F, the slot size S and the build size I. F, S, and I are known after the build phase. Because F and S are now fixed, the minimum requirement and the one-pass requirement are the same: 2 slots per partitions (i.e. 2×S×F). The minimum memory requirement could have been one slot per partition without asynchronous I/Os. Maximum memory requirement is the memory required to fully load all the build partitions into memory plus some extra overhead memory (memory used for control structures like the hash table).

In act 92, based on these initial memory requirements and the maximum amount of memory bound available, the hash-join operator determines the number B of build partitions to load in memory. If needed, other build partitions (F−B) are unloaded to disk. Rows of the in-memory build partitions are inserted into a hash table to quickly match them with probe rows as discussed next in act 93.

Processing the probe input is started/resumed in act 93. Specifically, input rows from the probe input are consumed and their destination partition computed using the same hash function used to split the build input. If the matching build partition resides in memory, matching rows from the build input are immediately retrieved using the hash table and returned. If the matching build partition resides on disk, the probe row is simply inserted into its corresponding probe partition. It will be processed later, during the final probe phase. A memory reconfigure action (see act 94 described next) is triggered during this act 93, based on a time-out occurring for example every n seconds (e.g. n=60) or every n' probe rows (e.g. n'=1000).

The external memory bound can change at any point based on the system workload. The adaptive hash-join operator reacts to this change as follows. Based on the existing memory requirement and the external bound, the hash-join operator determines the new size of its work area. If the size of the hash-join work area is reduced, resizing involves spilling some build partitions from memory to disk such that the memory used doesn't exceed the new memory size. Conversely, if the new size is larger than the current work area size, the hash-join operator reloads some build partitions from disk to memory. In both cases, the in-memory hash table needs to be updated accordingly. Once the resize operation is completed, processing the probe input is resumed (act 93). Acts 93 and 94 are repeated until all probe rows are consumed.

After acts 93 and 94, the method reaches the final phase of hash-join. It processes all probe rows which could not have been joined during the hybrid phase (FIG. 10) since their corresponding build partition was stored on disk and not in memory. This phase (also called "probe phase") processes each pair of build/probe partition independently. For each pair, it determines the smallest partition in the normal manner of hash-join (generally the build partition). This partition is joined to its sibling partition in the normal manner of hash-join, and the process is repeated for each partition pair.

In a worst case scenario, the work area size can be greater than build table size by the minimum work area size S×F, where S is slot size and F is the number of partitions. It is normally not known when each partition will finish. If the unit of allocation is one slot, at most one slot per partition may be wasted. For this reason, as long as memory bound is sufficiently large to permit execution of the hash-join operator in optimal mode, the operator dynamically increases its memory (up to the optimal mode estimate), e.g. to store input rows in the F partitions. For this reason, as long as memory bound is sufficiently large to permit execution in optimal mode, the hash-join operator probes in memory. If the memory bound is reduced sufficiently, the mode is changed to one-pass and the hash-join operator switches to a one-pass probe by resizing its hash area. At that time, I/O slots are flushed to disk. Once this is done, an extra re-split can be performed if the one-pass estimates are incorrect by a large factor (e.g. 2).

In another embodiment, memory bound is dynamically changed by memory broker, depending on memory requirements of various processes and/or operators in the system. For this reason, each operator registers information in a shared area accessed by memory broker (e.g. provides an estimate of memory required in each of the three modes: optimal mode, one pass mode and minimal mode). In one implementation, only when the work area estimated by an operator exceeds a predetermined value (such as 128 KB), the operator register the estimate. Estimates that are equal to and less than the predetermined value are not registered, so as to limit the impact of use of the memory broker in online transaction processing (OLTP) applications, where inputs to a sort operator are most of the time very small, as compared to other applications. Therefore, involvement of the memory broker for tiny work areas may be avoided.

Operators of this embodiment are responsive to the load on the system as a whole, by taking into account memory bound. For example, if the memory bound value is decreased, a currently-executing hash join operator may change its mode from an optimal mode (which needs no access to disk during execution), to a one pass mode, by transferring the current data from memory to disk. So, one or more operators their memory usage when the amount of data processed is different from their current estimate as described above.

Specifically, if memory bound has been exceeded, operator checks if it has a mode that takes less memory (e.g. if it is currently in optimal mode it may transition to one pass mode, or from one pass mode to minimal mode). If so, operator changes mode and revises the estimate of memory needed in the changed mode, and thereafter returns to processing data. If operator has no mode that takes less memory, it checks if the slot size is at the smallest possible value, and if not at smallest then slot size is reduced. In this manner, operator does everything it can to reduce memory usage.

If memory usage is already at its minimum, operator continues processing of data using the currently allocated memory and current slot size. In such a case, memory bound is exceeded, but there is no change in memory usage by operator, and memory bound is treated as a target rather than as a limit. Alternatively, some operators (e.g. the bitmap merge operator) may suspend further operations until memory is available, while other operators (such as sort and hash join) simply continue processing. Moreover, although a change in slot size 14B is done for some operators, such change may not be done for other operators. Similarly, a change in mode may not be possible for some operators (e.g. the bitmap merge operator).

Moreover, memory bound may be common for all operators, or there may be multiple memory bounds, e.g. one for each type of operator (such as a first memory bound for sort, and a second memory bound for hash-join). A common memory bound ensures that if two operators and have the same memory requirement, they get work areas of the same size. As common memory bound is applicable across the entire database, this is true between operators which are active simultaneously within the same query, as well as between different queries. Such use of a common memory bound is used in one embodiment when a query is executed in parallel, so that each operator receives the same amount of working memory, thereby to avoid execution skew. The common memory bound provides more consistent response time if the workload does not change. For example, if the available memory is 100M and we have 10 concurrent queries running on the system, common memory bound avoids giving 10M of memory to each query, and instead the 100M of memory is divided among queries based on the memory requirement of individual operators used within each query.

As would be apparent to the skilled artisan, the database system may include any computer (such as a Sun workstation, or an IBM Personal Computer) that contains one or more central processing units (CPUs) coupled to main memory, with the main memory containing appropriate code and data to achieve database functionality.

Numerous modifications and adaptations of the embodiments and implementations described herein will be apparent to the skilled artisan in view of the disclosure. For example, after completion of execution of a query, statistics specific to the query may be saved for use in making an estimate when that very same query needs to be executed again (e.g. by another process). Moreover, in several embodiments, a computer readable storage medium (such as but not limited to memory, RAM, ROM and disk) stores instructions to cause a computer to perform various acts of the type described herein.

Also, if all active operators could run with their minimum memory and assuming that more memory is available, memory broker may allocate that memory first to operations which would benefit the most from a memory increase. For example, memory broker may be programmed to give more memory to a hash-join operation so that its response time is reduced from 5 minutes to 1 minute (5 times speed-up) versus giving the same amount of memory to another hash join operation so that its response time is reduced from 1 hour to 30 minutes (only two times speed-up). Therefore, one embodiment considers the response time speed-up and not really the absolute improved time. Moreover, a memory bound can also be used as described herein, in databases that allocate all of the memory required by operators in shared memory (instead of private memory). Furthermore, although the above description refers to the mode of each operator being changed by the operator itself, in other embodiments, another process such as the memory broker may change the mode of each process (in which case each process is responsive to their own mode being changed instead of responding to a change in a memory bound).

Therefore, numerous such modifications and adaptations of the embodiments and implementations described herein are encompassed by the attached claims.

The invention claimed is:

1. A method of processing data in a computer, the method comprising:
    performing an operation in a first mode, to process a portion of data;
    changing an estimate of size of memory to be allocated for the operation based at least on said portion of data already processed during said operation in said first mode; and
    performing said operation in a second mode to process an additional portion of data which remains to be processed, using memory allocated based on the size estimate obtained by said changing;
    wherein each of the first mode and second mode is one of a set of pre-defined modes internal to the operation.

2. The method of claim 1 wherein:
    the estimate of memory size changes based on said portion of data already processed during said operation in said first mode.

3. The method of claim 1 further comprising:
    allocating a predetermined amount of memory prior to performing the operation in the first mode.

4. The method of claim 1 further comprising:
    periodically checking for a change in basis of the estimate of size of memory; and
    in response to a change found during said periodically checking, repeating said changing.

5. The method of claim 1 further comprising:
    checking for a change in basis of the estimate of size of memory, in response to an asynchronous event.

6. The method of claim 1 wherein:
    at least one of the first mode and the second mode is one pass.

7. The method of claim 1 wherein:
    the portion of data and the additional portion of data comprise records of a relational database; and
    the operation is hash-join.

8. The method of claim 1 wherein:
    the portion of data and the additional portion of data comprise records of a database; and
    the operation is sort.

9. The method of claim 1 wherein:
    the portion of data and the additional portion of data comprises records of a relational database; and
    the operation is bitmap merge.

10. The method of claim 1 wherein:
    the changing includes reducing; and
    the method comprises writing at least said portion of data to disk prior to performing the operation in the second mode on the additional portion of data.

11. The method of claim 1 wherein the memory is used in a plurality of slots of a slot size, the method further comprising:
    changing the slot size;
    allocating memory after the change in slot size; and
    performing the operation in the second mode, to process the additional portion of data, using memory obtained during the allocating.

12. The method of claim 1 wherein:
    the changing includes increasing.

13. The method of claim 12 wherein:
    the size estimate obtained after changing is sqrt(2) times the estimate of size prior to changing.

14. The method of claim 1 wherein:
    the operation is sort;
    a second estimate after the change is obtained by multiplying the size of partially processed data by a predetermined factor.

15. The method of claim 14 wherein:
    the predetermined factor is 2.

16. The method of claim 1 wherein:
    the operation is hash-join;
    the second mode is one pass;
    the data relates to a build table; and
    the method further comprises:
    computing a third estimate based on a size of the data determined after completion of processing of data; and
    if the third estimate is greater than 2 times the second estimate, then the method further comprises determining a third amount of memory based on the third estimate and a mode of the hash-join operation, and allocating the third amount of memory, and applying the operation to the data another time, using the third amount of memory.

17. The method of claim 1 wherein:
    each of the first mode and the second mode perform only one of (no access to disk, access to disk only once, and access to disk multiple times).

18. The method of claim 1 wherein:
    said changing increases the estimated size only when the operation is determined to experience a decrease in response time.

19. The method of claim 18 wherein:
    when the operation does not experience said decrease, the operation continues in one-pass, thereby to make available to other operations, memory in the size of a difference between cache and one-pass memory requirements.

20. The method of claim 1 wherein:
    the estimate of memory size is determined to be less than a predetermined factor times an ideal memory size based on knowledge of total size of the data.

21. The method of claim 1 wherein:
    the portion of data comprises records of a database; and
    the operation is performed in response to a query.

22. A computer-readable storage medium comprising a sequence of instructions, said sequence of instructions comprising:
  instructions to perform an operation in a first mode, to process a portion of data;
  instructions to change an estimate of size of memory to be allocated for the operation based at least on said portion of data already processed during said operation in said first mode; and
  instructions to perform said operation in a second mode to process an additional portion of data which remains to be processed, using memory allocated based on the size estimate obtained by said instructions to change;
  wherein each of the first mode and second mode is one of a set of pre-defined modes internal to the operation.

23. A computer-readable storage medium comprising:
  a first storage location comprising an estimate of size of data to be input;
  a second storage location comprising current size of a portion of data input so far;
  a third storage location comprising an instruction to increase the estimate when the current size has a predetermined relation to the estimate; and
  a plurality of additional storage locations comprising a corresponding plurality of instructions to be applied to the portion of data.

24. The computer-readable storage medium of claim 23 wherein:
  the predetermined relation is "greater than or equal to."

25. The computer-readable storage medium of claim 23 wherein:
  the plurality of instructions include instructions for a sort operator.

26. The computer-readable storage medium of claim 23 wherein:
  the plurality of instructions include instructions for a hash-join operator.

27. The computer-readable storage medium of claim 23 further comprising:
  a fourth storage location comprising a slot size related to input or output of the portion of data.

28. The computer-readable storage medium of claim 27 further comprising:
  a fifth storage location storing $\sqrt{2IS}$, wherein I is the value in the first storage location in units of the number of slots, and S is the value in the fourth storage location in bytes.

29. The computer-readable storage medium of claim 23 further comprising:
  a relational database containing the data;
  wherein said instructions are comprised in an operator in a relational database system.

30. A computer-readable storage medium comprising a plurality of instructions, the plurality of instructions comprising:
  instructions to apply an operator, to process a portion of data from a database, using a first amount of memory; and
  instructions to apply the operator, to process an additional portion of data which remains to be processed, using a second amount of memory;
  wherein the operator includes a first set of instructions for use in processing the portion of data when using the first amount of memory; and
  wherein the operator includes a second set of instructions for use in processing the additional portion of data when using the second amount of memory.

31. The computer-readable storage medium of claim 30 wherein:
  the first set of instructions does not store the portion of data to disk; and
  the second set of instructions uses only one pass.

32. The computer-readable storage medium of claim 30 further comprising:
  instructions, responsive to a predetermined condition being satisfied, to switch from executing the first set of instructions to executing the second set of instructions.

33. The computer-readable storage medium of claim 30 wherein:
  said operator is executed within a relational database system.

34. A computer-readable storage medium comprising a plurality of instructions, the plurality of instructions comprising:
  instructions to apply a sort operator, to process a portion of data from a database, using a first amount of memory; and
  instructions to apply the sort operator, to process an additional portion of data which remains to be processed, using a second amount of memory.

35. The computer-readable storage medium of claim 34 wherein:
  the sort operator includes a first set of instructions for use in processing the portion of data when using the first amount of memory;
  the sort operator includes a second set of instructions for use in processing the additional portion of data when using the second amount of memory; and
  the sort operator further comprises instructions to switch from executing the first set of instructions to executing the second set of instructions in response to a predetermined condition being satisfied.

36. The computer-readable storage medium of claim 35 wherein:
  each of the first set of instructions and the second set of instructions perform only one of (no access to disk, access to disk only once, and access to disk multiple times).

37. The computer-readable storage medium of claim 34 wherein:
  said operator is executed within a relational database system.

38. A computer-readable storage medium comprising a plurality of instructions, the plurality of instructions comprising:
  instructions to apply a hash-join operator, to process a portion of data from a database, using a first amount of memory; and
  instructions to apply the hash-join operator, to process an additional portion of data which remains to be processed, using a second amount of memory.

39. The computer-readable storage medium of claim 38 wherein:
  the hash-join operator includes a first set of instructions for use in processing the portion of data when using the first amount of memory;
  the hash-join operator includes a second set of instructions for use in processing the additional portion of data when using the second amount of memory; and
  the hash-join operator further comprises instructions to switch from executing the first set of instructions to executing the second set of instructions in response to a predetermined condition being satisfied.

40. The computer-readable storage medium of claim 39 wherein:

each of the first set of instructions and the second set of instructions perform only one of (no access to disk, access to disk only once, and access to disk multiple times).

41. A computer-readable storage medium comprising a plurality of instructions, the plurality of instructions comprising:

instructions to apply an operator, to process a portion of data from a database, using a first amount of memory; and instructions to apply the operator, to process an additional portion of data which remains to be processed, using a second amount of memory;

wherein the first amount of memory is predetermined, regardless of an estimate, by an optimizer, of the memory needed to process the data.

42. The computer-readable storage medium claim 41 further comprising:

a storage medium storing instructions, responsive to a predetermined condition being satisfied, to switch between said means for applying the operator using the first amount of memory to said means for applying the operator using the second amount of memory.

43. The computer-readable storage medium of claim 41 wherein:

said operator is executed within a relational database system.

44. A computer-readable storage medium comprising a plurality of instructions, the plurality of instructions comprising:

instructions to apply an operator, to process a portion of data from a database, using a first amount of memory;

instructions to apply the operator, to process an additional portion of data which remains to be processed, using a second amount of memory; and instructions to periodically check for need to change, from using the first amount to using the second amount.

45. The computer-readable storage medium of claim 44 wherein:

said operator is executed within a relational database system.

46. A computer-readable storage medium comprising a plurality of instructions, the plurality of instructions comprising:

instructions to apply an operator, to process a portion of data from a database, using a first amount of memory;

instructions to apply the operator, to process an additional portion of data which remains to be processed, using a second amount of memory; and instructions to asynchronously check for need to change, from using the first amount to using the second amount, in response to a message.

47. The computer-readable storage medium of claim 46 wherein:

said operator is executed within a relational database system.

48. A computer-readable storage medium comprising instructions to cause a computer to:

receive a plurality of rows containing data from a relational database stored in memory of the computer, the relational database comprising a plurality of tables for holding the data;

allocate a first amount of memory to hold the rows based on an estimate of the size of the data, prior to receiving the plurality of rows;

perform an operation in a first mode, to process a first number of rows in said plurality, using the first amount of memory;

allocate a second amount of memory to hold an additional number of rows in said plurality, based on a current size of the first number of rows processed so far; and perform the operation in a second mode, to process the additional number of rows, using the second amount of memory.

49. The computer-readable storage medium of claim 48 wherein the data is from a first table, the operator is hash-join, and the medium comprises instructions to:

receive an additional plurality of rows containing data from a second table; and search for matches among rows from the first table and the second table using the hash-join operator, regardless of change in mode.

50. The computer-readable medium of claim 48 wherein the operator is sort, and the medium further comprises instructions to:

rearrange the rows in order using the sort operator, regardless of change in mode.

51. The computer-readable storage medium of claim 48 comprising:

instructions, responsive to a predetermined condition being satisfied, to switch from performing the operation in the first mode to performing the operation in the second mode.

52. A computer for processing a query in a database, the computer comprising:

first means for performing an operation to process a portion of data from said database;

second means coupled to the first means, for changing an estimate of size of memory needed for the operation if a size of said portion of data exceeds the estimate or if the estimate exceeds a size of memory that can be dedicated to the operation by the database; and third means coupled to the first means and the second means, for performing the operation to process an additional portion of data which remains to be processed, using memory of the estimated size.

53. The computer of claim 52 wherein:

the estimate of size of memory, needed by the first means for performing the operation, is initially of a minimum size.

54. The computer of claim 52 wherein:

the estimate of size of memory is initially of a fixed size, independent of an estimate provided by a query optimizer.

55. A computer-readable storage medium comprising instructions to cause a computer to:

apply an operator, to process a portion of data from a relational database in response to a query, using a first amount of memory;

wherein the relational database comprises said data organized into a plurality of tables connected to one another based on relationships of the data, each table in said relational database comprising at least one row;

wherein the operator comprises a first set of instructions to use the first amount of memory;

continue to apply said operator, to process an additional portion of data which remains to be processed to respond to said query, using a second amount of memory;

wherein the operator comprises a second set of instructions to use the second amount of memory.

56. The computer-readable storage medium of claim 55 comprising:

instructions, responsive to a predetermined condition being satisfied, to switch from executing the first set of instructions to executing the second set of instructions.

57. The computer-readable storage medium of claim 56 wherein:
the predetermined condition is based at least partially on statistics maintained during use of the first amount of memory.

58. The computer-readable storage medium of claim 55 wherein:
the first set of instructions does not store the portion of data to disk; and
the second set of instructions uses only one pass.

59. The computer-readable storage medium of claim 55 wherein:
said operator is a database operator.

60. The computer-readable storage medium of claim 55 wherein:
said operator is executed within a relational database system.

61. The computer-readable storage medium of claim 55 wherein:
said operator comprises a hash-join operator.

62. The computer-readable storage medium of claim 55 wherein:
said operator comprises a sort operator.

63. The computer-readable storage medium of claim 55 wherein:
said operator comprises a group by operator.

64. The computer-readable storage medium of claim 55 wherein:
said operator comprises a bitmap merge operator.

65. The computer-readable storage medium of claim 55 wherein:
said operator comprises a bitmap index creation operator.

66. The computer-readable storage medium of claim 55 wherein:
said operator comprises a buffer operator.

67. The computer-readable storage medium of claim 55 wherein:
said operator comprises a cube operator.

68. The computer-readable storage medium of claim 55 wherein:
said operator comprises a window function.

* * * * *

UNITED STATES PATENT AND TRADEMARK OFFICE
CERTIFICATE OF CORRECTION

PATENT NO.        : 7,499,960 B2                                    Page 1 of 1
APPLICATION NO.   : 09/969334
DATED             : March 3, 2009
INVENTOR(S)       : Dageville et al.

It is certified that error appears in the above-identified patent and that said Letters Patent is hereby corrected as shown below:

In column 1, line 11, delete "Zait."" and insert -- Zait. --, therefor.

In column 4, line 9-10, delete "interface."" and insert -- interface. --, therefor.

In column 4, line 59, delete "efficently" and insert -- efficiently --, therefor.

In column 7, line 26, delete "IP" and insert -- 11P --, therefor.

In column 12, line 57, delete "1/(2sqrt(2))" and insert -- 1/(2-sqrt(2)) --, therefor.

In column 23, line 19, in claim 42, after "medium" insert -- of --.

In column 24, line 17, in claim 50, after "readable" insert -- storage --.

Signed and Sealed this

Eighteenth Day of May, 2010

David J. Kappos
*Director of the United States Patent and Trademark Office*